US008312859B2

(12) United States Patent
Rom et al.

(10) Patent No.: US 8,312,859 B2
(45) Date of Patent: Nov. 20, 2012

(54) WANKEL AND SIMILAR ROTARY ENGINES

(76) Inventors: Haim Rom, Benyamina (IL); Tal Rom, Ramat Hagolan (IL)

(*) Notice: Subject to any disclaimer, the term of this patent is extended or adjusted under 35 U.S.C. 154(b) by 1160 days.

(21) Appl. No.: 12/063,209

(22) PCT Filed: Aug. 7, 2006

(86) PCT No.: PCT/IL2006/000911
§ 371 (c)(1),
(2), (4) Date: Mar. 31, 2008

(87) PCT Pub. No.: WO2007/017867
PCT Pub. Date: Feb. 15, 2007

(65) Prior Publication Data
US 2008/0190395 A1      Aug. 14, 2008

(30) Foreign Application Priority Data
Aug. 8, 2005  (IL) .......................................... 170165

(51) Int. Cl.
*F02B 53/08*   (2006.01)
*F02B 53/04*   (2006.01)
*F01C 1/02*    (2006.01)

(52) U.S. Cl. ........ 123/213; 123/219; 123/222; 418/61.2

(58) Field of Classification Search .................. 123/213, 123/215, 238, 228–229, 222, 219, 242; 418/61.2, 418/104
See application file for complete search history.

(56) References Cited

U.S. PATENT DOCUMENTS

| 1,228,806 | A | | 6/1917 | Morris |
| 1,242,826 | A | | 10/1917 | Llewellyn |
| 2,179,401 | A | | 10/1935 | Chkliar |
| 2,698,130 | A | * | 12/1954 | Mossin .......................... 418/204 |

(Continued)

FOREIGN PATENT DOCUMENTS

DE        2060 067        5/1972

(Continued)

OTHER PUBLICATIONS

Japanese office action (translated) that corresponds to this application, 8 pages, mailed Jan. 18, 2011.

*Primary Examiner* — Thai Ba Trieu
(74) *Attorney, Agent, or Firm* — Roach Brown McCarthy & Gruber, P.C.; Kevin D. McCarthy

(57) ABSTRACT

An improved rotary engine system has two stationary buffer seals located at the two ends of the minor axis of a rotor housing that divide the rotor housing into two separate volumes. A first volume is an intake and compression volume and a second volume downstream to the first volume is an expansion and exhaust volume. A rotating combustion chamber flow control device (CCFC) is synchronized with a rotor, for receiving compressed fluid from the first volume, for receiving fuel injected by a fuel injector located within a corresponding CCFC, for igniting and burning an air-fuel mixture, to allow combustion products to expand in the second volume, and for transferring the combustion products to the second volume. In one embodiment, the CCFC is synchronized with two longitudinal shafts fitted at centers of first and second housings, respectively, in each of which are located a pair of side by side rotors.

28 Claims, 26 Drawing Sheets

U.S. PATENT DOCUMENTS

| | | | |
|---|---|---|---|
| 2,794,429 A * | 6/1957 | Walter | 123/222 |
| 3,215,129 A * | 11/1965 | Johnson | 123/222 |
| 3,228,183 A * | 1/1966 | Feller | 123/213 |
| 3,236,213 A * | 2/1966 | Yokoi et al. | 123/213 |
| 3,371,654 A * | 3/1968 | Garside | 123/213 |
| 3,732,689 A * | 5/1973 | Tado et al. | 123/213 |
| 3,782,337 A * | 1/1974 | Feller | 123/213 |
| 3,858,557 A | 1/1975 | Myers et al. | |
| 3,903,848 A * | 9/1975 | Tabaczynski | 123/219 |
| 3,904,332 A | 9/1975 | Clough, Jr. | |
| 3,930,469 A * | 1/1976 | Tabaczynski | 123/219 |
| 4,386,890 A | 6/1983 | Berkowitz | |
| 4,657,009 A | 4/1987 | Zen | |
| 4,848,295 A | 7/1989 | Loran et al. | |
| 4,964,275 A | 10/1990 | Paul et al. | |
| 5,049,051 A | 9/1991 | Keleher | |
| 6,125,814 A * | 10/2000 | Tang | 123/222 |
| 7,100,566 B2 * | 9/2006 | Stanishevskaya | 123/222 |

FOREIGN PATENT DOCUMENTS

| | | |
|---|---|---|
| FR | 1302333 A * | 7/1962 |
| GB | 1483096 | 8/1977 |
| GB | 1512021 A * | 5/1978 |
| JP | A 50044306 | 4/1975 |
| JP | 54160954 A1 | 12/1979 |
| JP | 5-505008 A1 | 4/1991 |
| JP | 20002507661 | 10/1997 |
| RU | 2204032 | 10/2003 |
| WO | 8606437 | 11/1986 |
| WO | WO 02097249 A1 * | 12/2002 |

* cited by examiner

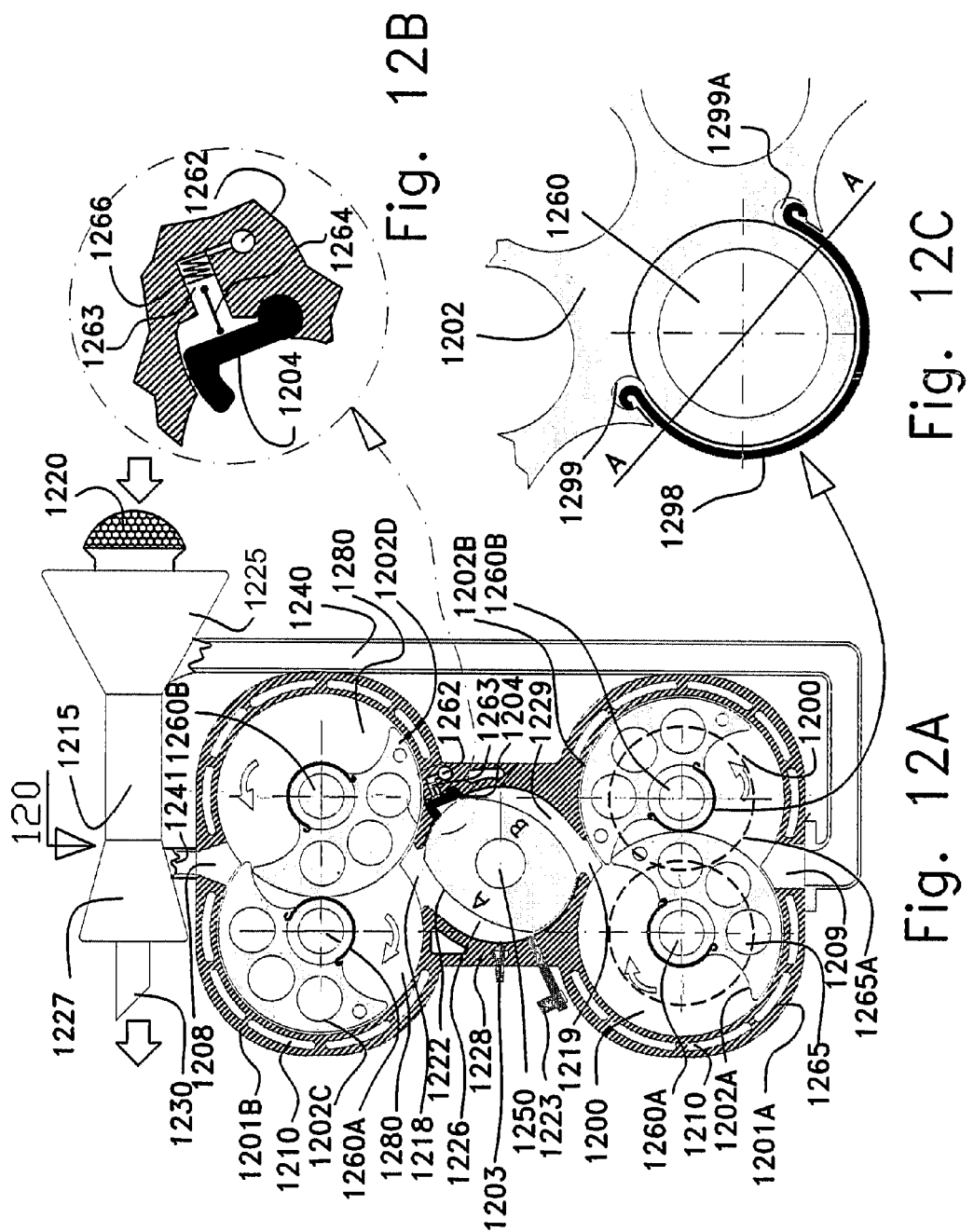

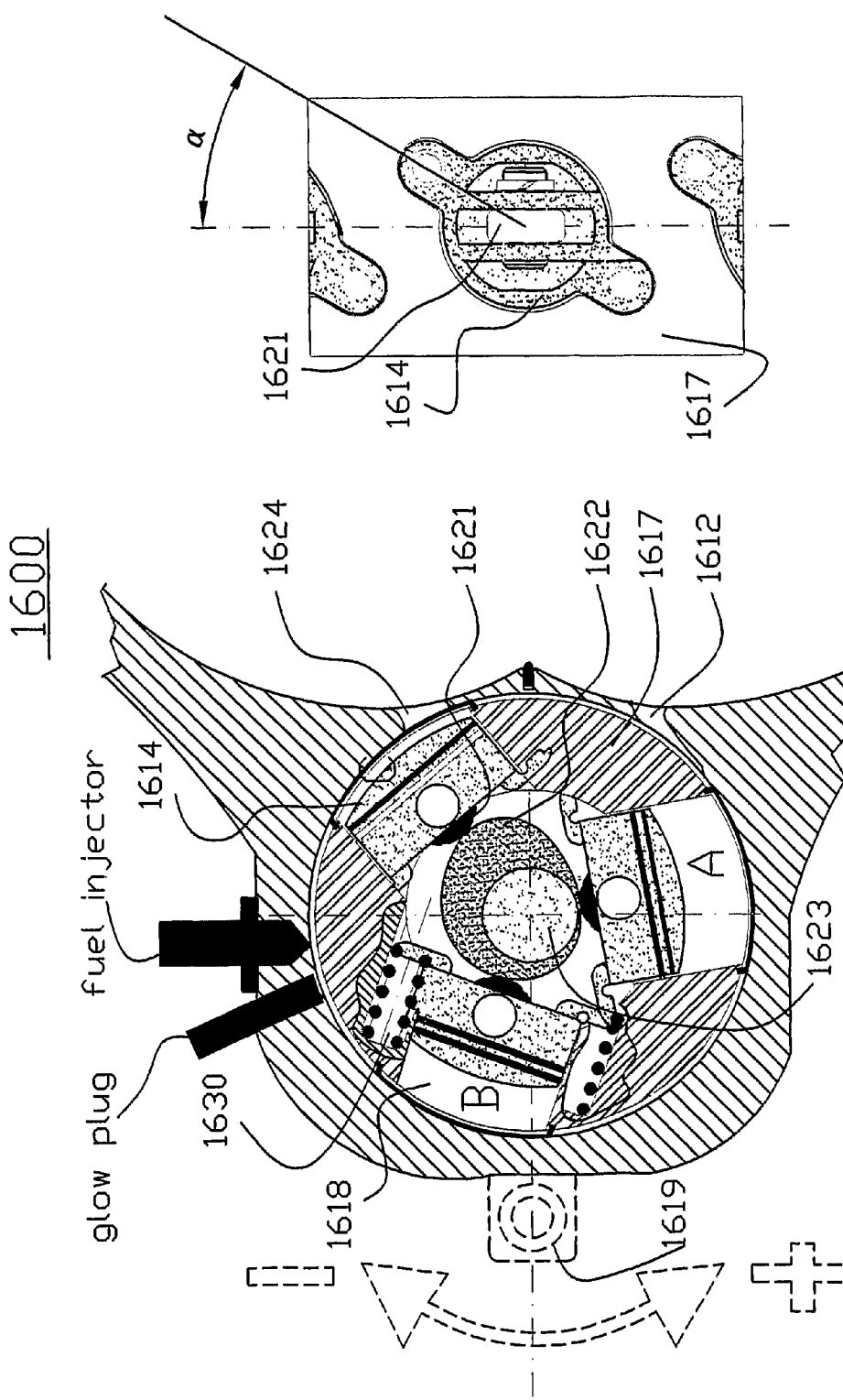

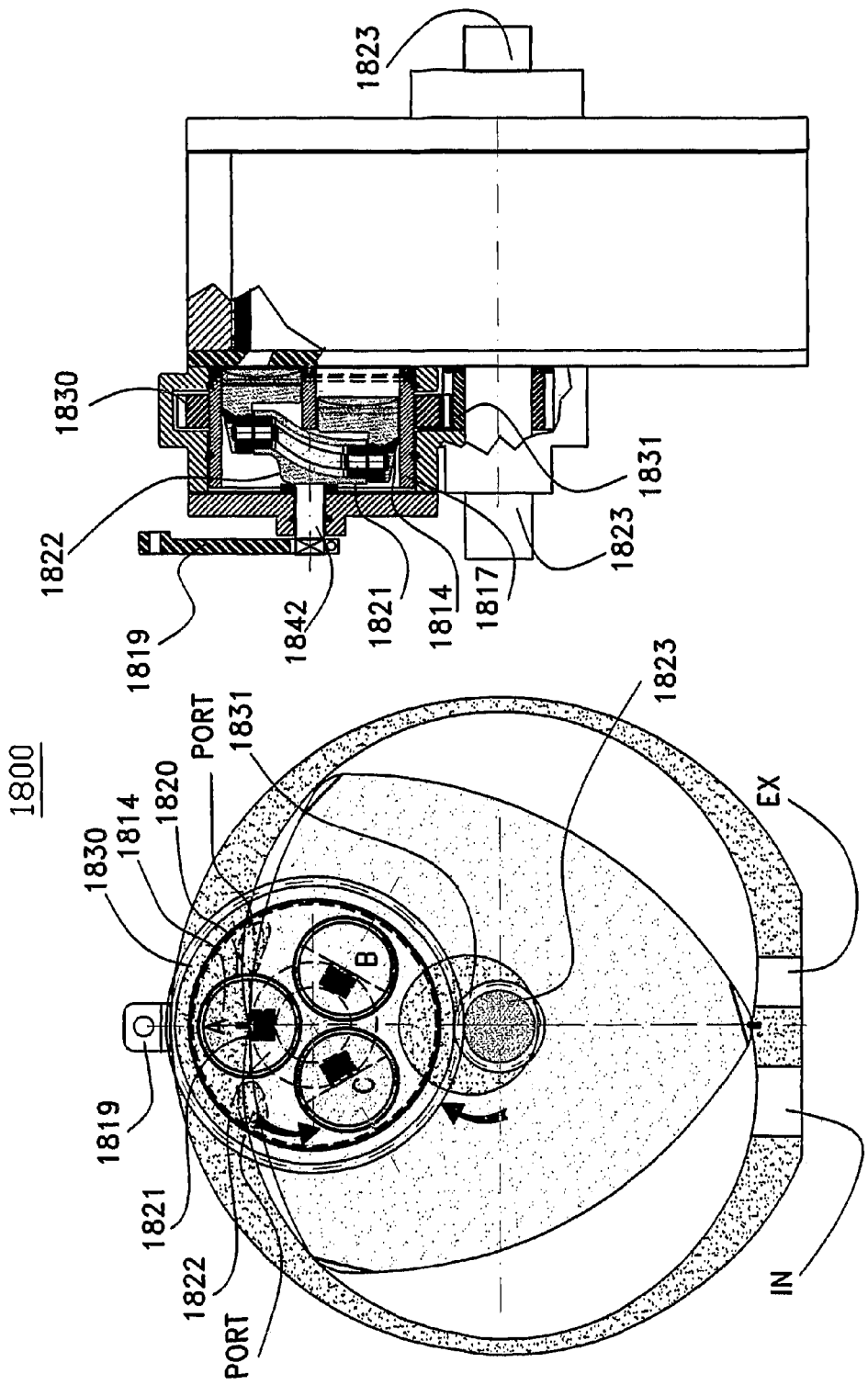

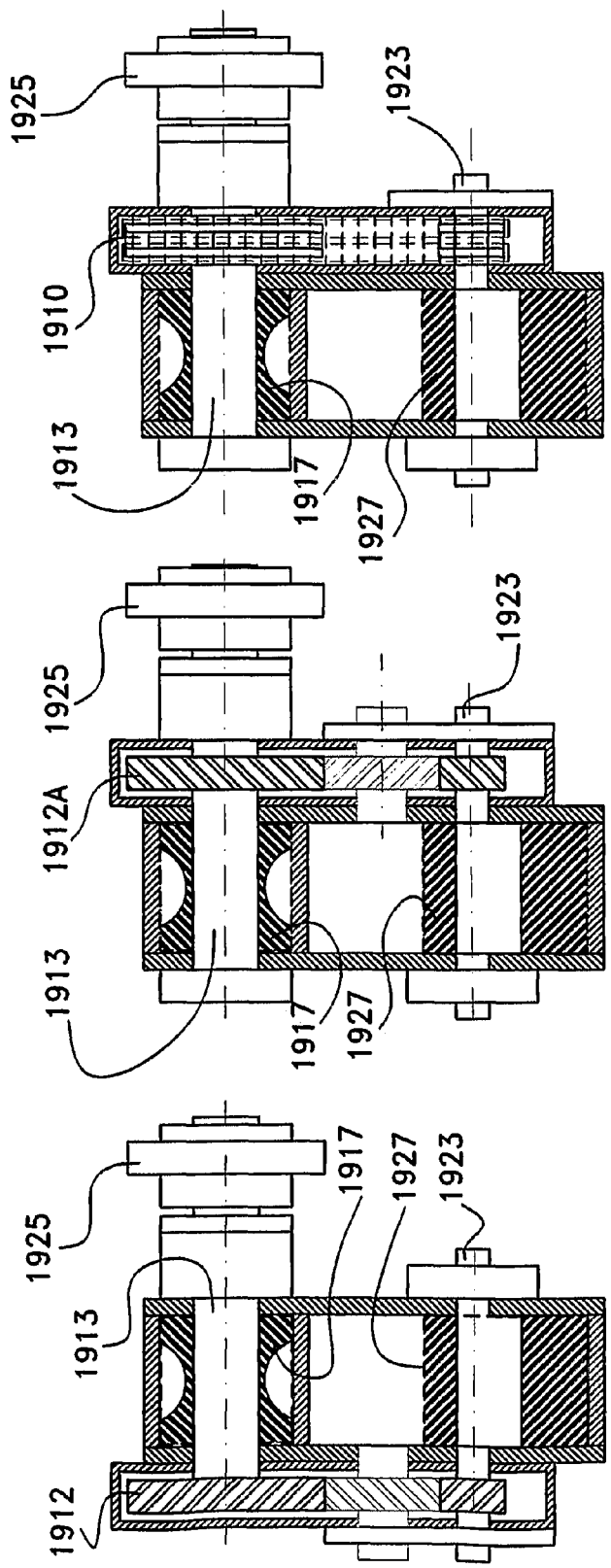

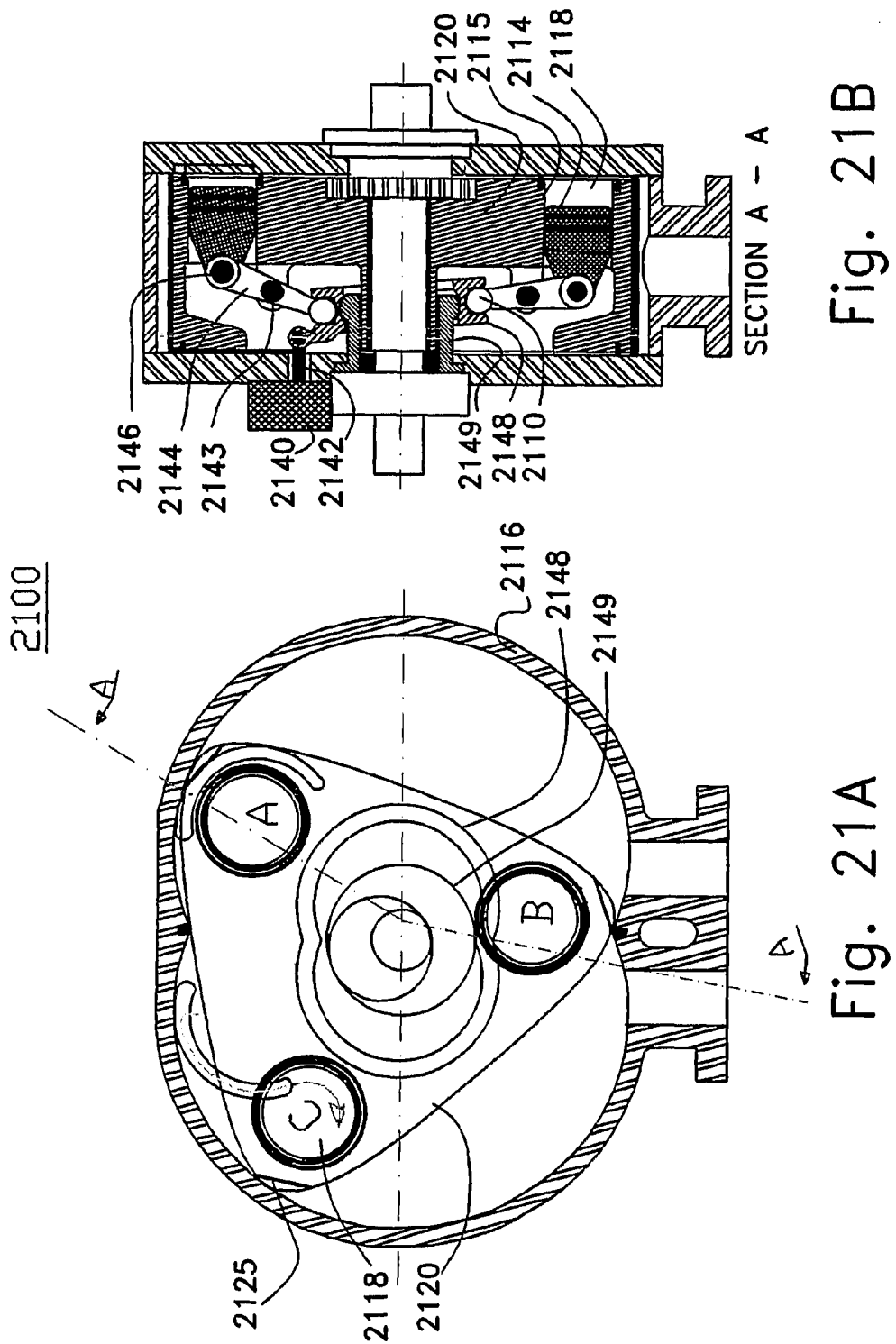

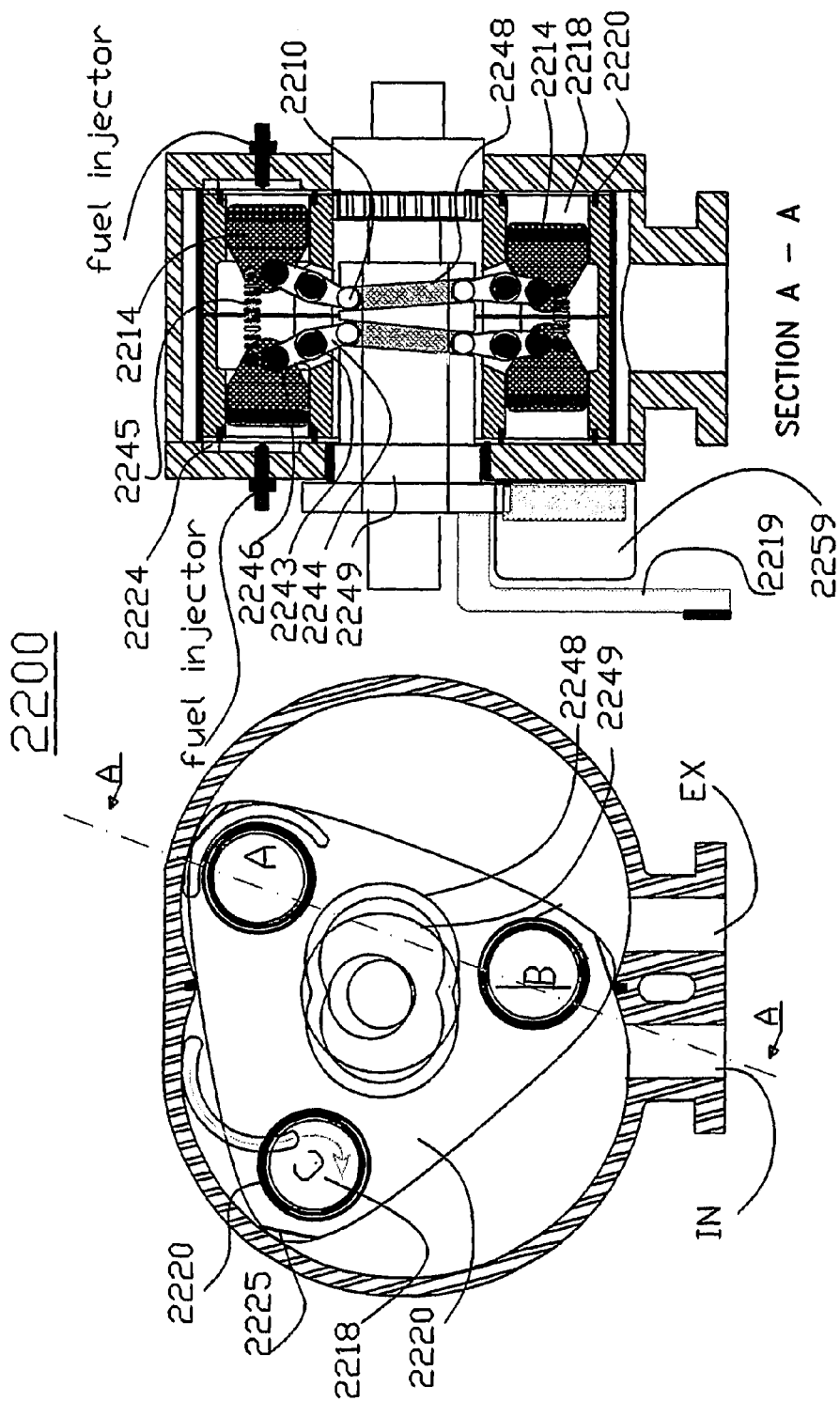

WANKEL AND SIMILAR ROTARY ENGINES

CLAIM OF PRIORITY

This application claims priority as a 371 of international application serial number a 371 of international patent application serial number PCT/IL2006/000911, filed on Aug. 7, 2006 which claims priority to Israeli patent application number 170165, filed on Aug. 8, 2005.

FIELD OF THE INVENTION

The present invention relates in general to rotary engines. In particular, the present invention relates to improvements in Wankel and similar rotary engines which, by being applied to a prior art engine, significantly raises its power output and efficiency and enables a more advanced cycle.

BACKGROUND OF THE INVENTION

The manufacturers of Wankel rotary engines have attempted to provide an internal combustion engine that overcomes most of the drawbacks of a reciprocating piston engine, while operating very smoothly and having a high power to weight ratio and a higher rotational speed with respect to a reciprocating piston engine. After many years of Wankel engine development, there are some practical limitations that prevent its widespread acceptance, despite its theoretical advantages with respect to a reciprocating piston engine. Consequently, only a limited number of manufacturers are involved with Wankel engine production.

A typical prior art Wankel rotary engine is illustrated in FIG. 1, and is designated by numeral 10. A Wankel rotary engine 10 comprises rotor housing 101, rotor 102, spark plug 103, apex seal 104, eccentric shaft 105, stationary gear 106, rotor gear 107, exhaust port 108, inlet port 109. The minor axis of the trochoidal shape of the rotor housing is 110 and the major axis of the housing is 111. Each of the three faces A, B, and C of rotor 102 is involved sequentially with the following four cycles: intake cycle, compression cycle, power cycle and exhaust cycle. Fresh mixture is drawn through inlet port 109 by face A of the rotor 102 until it is at a peak volume. At the same time, face B is driven by the combustion forces and face C forces out the exhaust gas through the exhaust port 108.

Some of the Wankel rotary engine limitations relate to its rotor apex seals, as expressed by the following characteristics:

Tendency to bounce over housing internal contour;
Incompatibility of a suitable material for the apex seal with that of the rotor housing;
Damage to the internal contour of the rotor housing and to the seals;
Speed limitations due to high centrifugal forces;
Poor sealing at a low rotational speed and under sudden changes of operational conditions such as acceleration and deceleration and of engine load; and
Sealing limitations of the apex seal when the engine is exposed to a relatively high pressure, which is characteristic of Diesel engines.

All of the above-mentioned limitations result in inadequate sealing that leads to low reliability and short duration of operation, defined also as a short time between overhauls (TBO).

Other known drawbacks of prior art Wankel rotary engines are:

The combustion chamber is not optimally configured for its function, and is therefore one of the main reasons for its inability in achieving efficient combustion and for its relatively low thermal efficiency.

A tendency to mix intake charge with burnt exhaust gases during exhaust-intake overlap, which reduces engine efficiency and output. The utility of a turbocharger, which further mixes the intake charge with the exhaust gases, is reduced since a greater percentage of the burnt gas is forced thereby to remain in the engine, to drift by the motor rotor to the intake section thereof, and to mix with the intake charge.

A high surface to volume ratio, resulting in fuel condensation on the inner walls of the working volumes, which is particular noticeable in water-cooled engines and negatively influences efficiency and wear.

At the beginning of each work cycle, a noticeable conflict is characteristic of prior art Wankel engines resulting in inefficient utilization of combustion products, between the geometrical position of the rotor during ignition to the direction of the driving forces generated by the combustion products. At ignition, the leaning angle of the rotor (i.e., the angle of inclination of a line coincident with the seal and the engagement point of the stator and rotor gears with respect to the minor axis of the rotor housing) bisects the two opposed rotational directions of the expansion forces generated by the burnt gases, resulting in a combustion force opposing the rotational direction of the rotor to be of a magnitude substantially equal to that of the combustion force supporting the rotation of the rotor. As the rotor rotates and the leaning angle changes, the magnitude of the combustion force supporting the rotation of the rotor correspondingly increases such that it is of a magnitude significantly greater than that which opposes the rotational direction of the rotor. When the leaning angle is approximately 60 degrees, substantially all of the combustion forces support the rotation of the rotor; however, the remaining pressure of the combustion products is very low at such a leaning angle indicating that the work cycle is about to end.

In addition to the previously mentioned conflict, substantially all of the combustion pressure is generated, immediately after ignition, over the rotor and perpendicularly to the main shaft, imposing a very high load and stress to the engine system which must be taken into consideration during the engine system design.

The effective work cycle sector of prior art Wankel engine is considerably narrow, beginning after an apex of the rotor has passed the minor axis by about 60 degrees and ending after about 60 degree of rotation, where the same apex reaches the point which start to expose the exhaust port.

The compression ratio of prior art Wankel rotary engine depends on the K factor (defined as ratio of the rotor radius to eccentricity). A lower K factor allows for a smaller engine for a given displacement; however, its potential compression ratio is low and apex seal leaning angle is very high, as the apex seals must pass over a very tight housing contour at the minor axis lobes of the rotor housing. As the K factor getting increases, the engine size and the potential compression ratio increase for a given displacement, while the apex seal leaning angle decreases. In order to achieve reasonably good results with a prior art Wankel engine, limiting compromises must be made.

The eccentric motion of the rotor drive system assembly of the Wankel engine results in restrictions to engine speed, and poses dynamic balancing problems. The complex motion of the rotor and the eccentric shaft assembly results in a shaft speed three times higher than that of the rotor, thereby resulting in a low torque-high speed engine shaft power take off (P.T.O.)

Despite the aforementioned disadvantages, the Wankel rotary engine provides some significant characteristics which result in its attractiveness to various relevant industries. A suitable solution to the aforementioned disadvantages can provide a Wankel rotary engine with superiority over most reciprocating piston engines, and in certain embodiments, even over some gas turbine applications.

Therefore, it is an object of the present invention to provide an improved combustion engine that is suitable for land, marine and aviation propulsion, as well as for stationary pumping, electrical power and other domestic and industrial applications.

It is another object of the present invention to provide a rotary engine system with a bouncing free sealing method.

It is another object of the present invention to provide a rotary engine with an effective sealing method that is also less sensitive to material matching and is not affected by engine velocity.

It is another object of the present invention to provide a sealing system that does not damage the internal contour of the rotor housing and enables a higher operating pressure.

It is another object of the present invention to provide a method for shaping a compact and effective, controllable, combustion chamber.

It is another object of the present invention to provide a method for a compact, effective, and controllable, combustion chamber which is also a variable compression-ratio device that can automatically change the compression ratio during operation, in accordance with operational condition such as air density (altitude), ambient temperature and load.

It is another object of the present invention to provide a method of operation that completely scavenges exhaust gases and eliminates the mixing of intake charge with exhaust gases.

It is another object of the present invention to provide a rotary engine which employs a turbocharger without any negative influences on engine scavenging and the mixing of the intake charge with exhaust gases and therefore has increased output power and an improved power to weight ratio as well as an improved density compensation.

It is another object of the present invention to provide a rotary engine that eliminates fuel condensation on internal volume walls.

It is another object of the present invention to provide a rotary engine in which, geometrically, substantially all of the combustion pressure operates in the rotational direction from the beginning to the end of the work cycle.

It is another object of the present invention to provide a rotary engine that operates at a much wider working sector in comparison with the prior art Wankel engine and as a result, achieves a higher output and higher efficiency.

It is another object of the present invention to provide a rotary combustion engine that can efficiently burn a broad range of fuels.

It is another object of the present invention to provide a combustion rotary engine with low sensitivity to altitude (density compensated) for the benefit of aviation applications.

It is yet another object of the present invention to provide an improved, fully rotational, concentric, system, in contrast with the eccentric system of a Wankel engine, and to integrate such a concentric system with the additional improvements provided by the present invention.

It is yet another object of the present invention to provide a combustion engine system that is cost effective.

It is yet another object of the present invention to provide a rotary engine system that overcomes the disadvantages of the prior art devices while retaining their inherent advantages.

Other objects and advantages of the present invention will become apparent as the description proceeds.

SUMMARY OF THE INVENTION

The present invention provides improvements to Wankel and similarly configured rotary combustion engines. The engine of the invention comprises at least one rotary device (hereinafter referred to as "rotor") and corresponding rotor housing by which work is performed; two stationary buffer seals located at the two ends of the minor axis of said rotor housing which divide said rotor housing into two separate volumes, wherein a first volume is an intake and compression volume and a second volume downstream to said first volume is an expansion and exhaust volume; at least one flow control rotating combustion chamber device (CCFC) synchronized with said at least one rotor, for receiving compressed fluid, which is preferably air, from said first volume, transferring said compressed air to said second volume, and igniting and burning an air fuel mixture, thereby causing an expansion in said second volume; and a fuel injector located within said flow control rotating combustion chamber, for injecting fuel into said combustion chamber. The two seals are in permanent contact with the circumferential contour of the rotor.

According to a preferred embodiment, the engine comprise a compressor, particularly a turbo-compressor, driven by the fluid discharge from the outlet port during exhaust cycle and a CCFC device that serves also as a buffer between the compression sectors of the engine to its work sector.

In another embodiment, the engine comprises a flow control system and CCFC device in order to enable a volumetric, continuous-combustion, flow-cycle operation.

In one preferred embodiment, the present invention provides a flow cycle engine system which comprises:
a) First rotary device,
b) Second rotary device that is connected to the first rotary device in order to operate together and to achieve higher power output and to further smooth the operation,
c) Flow controlling device(s),
d) Two fuel injectors fed by a controlled fuel pump,
e) Initial igniters,
f) Combustors that contains d) and e),
g) Conduits that serves as the system flow connections between the operating units,
h) High pressure ratio turbo compressor,
i) Electronic and/or mechanical controller device to control fuel injection in accordance with air consumption.

In another preferred embodiment of the present invention the rotor apexes are carrying a specially shaped seal that can cope with the stationary seals, mainly designed for a non-turbocharged embodiment of the invention.

In another preferred embodiment of the present invention the specially shaped seals are situated in the stationary engine block minor axis lobs while the rotor is equipped with commonly shaped apex seals.

In preferred embodiment of the present invention, the rotor and the housing of the flow-controller device are shaped in such an away to function as a compact combustion chamber in order that ignition and combustion will occur at best possible conditions.

In another preferred embodiment of the present invention the flow-controller combustion device is of a variable compression ratio so that compression ratio can be automatically or manually changed during operation and, in addition, the combustion chambers are completely scavenged at the end of each cycle.

In another preferred embodiment of the present invention the flow controller combustion device is integrated with the main engine rotor, operating inside the rotor housing as a single constant-volume combustion-chamber for each rotor bank.

In another preferred embodiment of the present invention the flow controller combustion device is integrated with the main engine rotor, operating inside the rotor housing as a single variable combustion-ratio compression-chamber for each rotor bank.

In another preferred embodiment of the present invention the flow controller combustion device is integrated with the main engine rotor, operating inside the rotor housing as a double constant-volume combustion-chamber for each rotor bank.

In another preferred embodiment of the present invention the flow controller combustion device is integrated with the main engine rotor, operating inside the rotor housing as a double variable combustion-ratio compression-chamber for each rotor bank.

In a preferred embodiment of the present invention the sector, buffer-seals, are equipped with a bounce dumping system in order to improve sealing and therefore adequate separation between the two sectors of the inside housing volumes.

In another preferred embodiment of the present invention, a flow compressor is mechanically connected to the main shaft of the engine in order to function as a stand-alone, or a stage of plural compressors, in order to pressurize the intake charge of the engine.

In another preferred embodiment of the present invention, the engine is a fully rotational, concentric, volumetric system that functionally integrates with the other components of the present invention, in order to avoid the disadvantages of the eccentric, complex motion of the Wankel volumetric system.

An improved rotary engine provided with a fully rotational, concentric mechanism for volumetric displacement comprises a first housing for first and second side by side rotors which defines an intake and compression volume; a second housing for third and fourth side by side rotors which defines an expansion and exhaust volume and is constructed in tandem with said first housing; two longitudinal shafts, axially fitted with bearings at the centers of said first and second housings, respectively; two geared wheels that engages said two shafts so as to rotate in synchronized timed motion; a rotating combustion chamber flow control device synchronized with said shafts and with said rotors, for receiving compressed fluid from said intake and compression volume and transferring it to said second expansion and exhaust volume; and a fuel injector located in said rotating combustion chamber flow control device.

BRIEF DESCRIPTION OF THE DRAWINGS

In the drawings:

FIG. 12A is a schematic drawing which illustrates each rotor of a concentric and rotational volumetric positive displacement engine, according to yet another embodiment of the invention;

FIG. 12B is an enlarged view of a plunger of FIG. 12A;

FIG. 12C is an enlarged view of a rotor centrifugal band seal of FIG. 12A;

FIGS. 14A and 14B are a cross-sectional front view and a schematic side view, respectively, of hemispherical CCFCs, wherein FIG. 14A illustrates a cooling method and FIG. 14B illustrates a method for the evacuation of residual burnt gas from the compression chambers at the end of each cycle;

FIGS. 16A and 16B are partially schematic, front and side views, respectively, of a variable compression ratio CCFC in which the compression ratio is controlled by means of a unidirectional cam and spring loaded backward motion;

FIGS. 18A and 18B are cross-sectional front and side views, respectively, of a variable compression ratio CCFC which is disposed at the side of a rotor housing;

FIGS. 19A-C are cross-sectional views of three transmission arrangements, respectively that are suitable for driving a CCFC;

FIGS. 20A-C are cross-sectional views of a CCFC which is integral with the rotor, wherein FIG. 20A is a front view of the CCFC, FIG. 20B is a side view of a rotor cut about plane A-A of FIG. 20A and containing a single combustion chamber for each rotor face, and FIG. 20C is a side view of a rotor cut about plane A-A of FIG. 20A and containing two combustion chambers for each rotor face;

FIGS. 20D and 20E are cross-sectional views of a side pressure inhibiting CCFC which is integral with the rotor, wherein FIG. 20D is a pressure eliminating CCFC and FIG. 20E is a pressure reducing CCFC.

FIGS. 21A and 21B are cross-sectional views of a CCFC which is integral with the rotor, wherein FIG. 21A is a front view of the CCFC and FIG. 21B is a side view of a rotor cut about plane B-B of FIG. 21A; and FIGS. 22A and 22B are cross-sectional front and a side views, respectively, of an engine system in which the combustion chambers are integral with the rotor and have a double variable compression-ratio chamber mechanism.

DETAILED DESCRIPTION OF PREFERRED EMBODIMENTS

The present invention is a novel rotary engine configuration having at least one rotor and at least one rotating combustion chamber flow control device (CCFC), the rotation of which is synchronized with the rotation of each rotor. Two stationary buffer seals located at the two ends of the minor axis of the rotor housing divide the latter into two separate volumes, a first intake and compression volume and a second expansion and exhaust volume downstream to the first volume. Each CCFC receives compressed oxygenated fluid from the intake volume, injects fuel into the compressed fluid, ignites an air-fuel mixture, and transfers the combustion products to the expansion volume.

Figure 1:
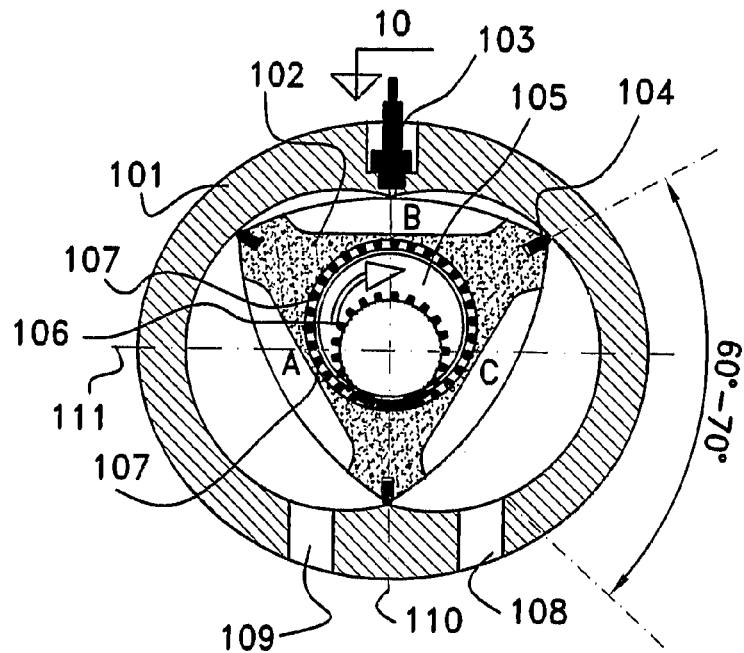
FIG. 1 is a cross-sectional drawing of a prior art Wankel rotary engine.
Figure 2:
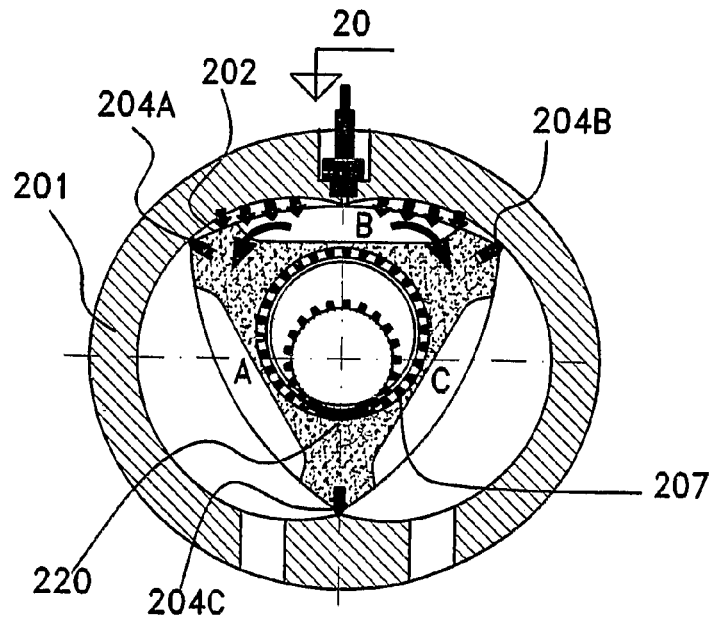
FIG. 2 is a schematic cross-sectional drawing of the engine of FIG. 1, illustrating the geometrical limitations of a prior art engine as combustion pressure forces the rotor to opposite rotational directions.
Figure 3:
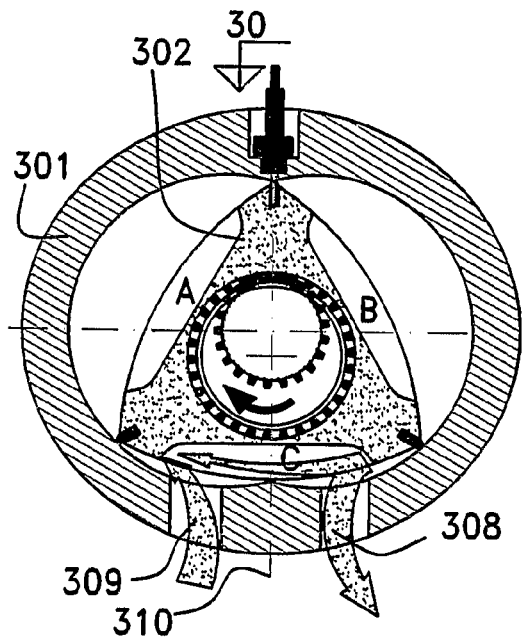
FIG. 3 is a schematic cross-sectional drawing of the engine of FIG. 1, illustrating the mixture of exhaust gases with the inlet charge in prior art Wankel engines.

To appreciate the utility of the engine configuration of the present invention, reference is first made to FIGS. 1-3, which illustrate several limitations of prior art Wankel rotary engines.

FIG. 1 illustrates the configuration of an exemplary prior art Wankel rotary engine generally indicated at 10, which comprises rotor housing 101, rotor 102 having faces A-C, stator gear 106, rotor gear 107, eccentric shaft 105, sparkplug 103, inlet port 109, and exhaust port 108. Epitrochoidal rotor housing 101 has a major axis 111 and a minor axis 110. The relatively narrow work sector of engine 10 is shown to be a relatively low range of 60-70 degrees, until exhaust port 108 is exposed.

FIG. 2 illustrates a well known geometrical conflict of a prior art Wankel engine 20, such that the force resulting from the pressure of the combustion products acts equally on both sides of a corresponding rotor face 202A-C, when the leaning angle 220 of the rotor 202 is perpendicular to the corresponding rotor face 202A-C. Apex seals 204A-C for sealing the volume defined by a corresponding rotor face 202A-C and the inner wall of the rotor housing 201 are also shown. The Wankel rotor is rotated by means of eccentric shaft 105, stator gear 106 and rotor gear 207, and is provided with an annular seal for preventing passage of combustion gases and oil (see seal 1009 of FIG. 10A and seal 1109 of FIG. 11A)."

FIG. 3 illustrates yet another known drawback of a prior art Wankel engine 30, whereby an intake charge is mixed with combustion products. While most of the burnt gases are discharged from the engine via exhaust port 308, a portion thereof remain within rotor housing 301 and are directed by e.g. rotor face 302C in the illustrated orientation of rotor 302 past the minor axis 310 of rotor housing 301 so as to mix with the fresh charge which is introduced to the rotor housing 301 via inlet port 309.

Figure 4:
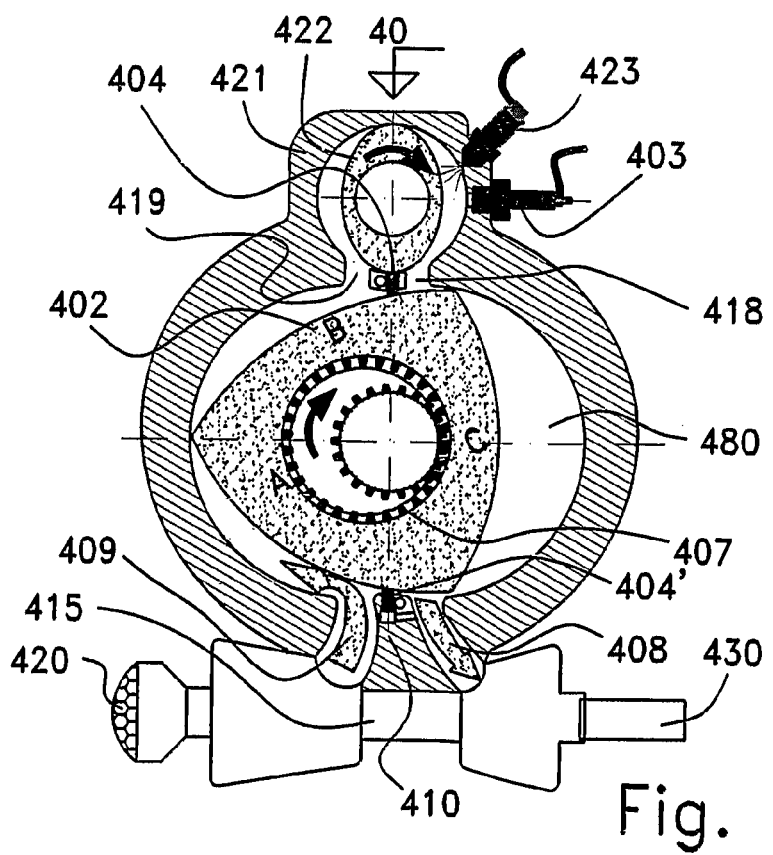
FIG. 4 is a cross-sectional drawing of a compression ignition engine, according to one embodiment of the invention.

FIG. 4 illustrates a preferred embodiment of the present invention, wherein a compression ignition (C.I.) engine generally indicated at 40 comprises a rotor housing 401 divided into two volumes by means of two buffer seals 404 and 404'. Two separate contact points of the contour of rotor 402 are constantly in contact with the buffer seals 404 and 404', respectively, in order to perform a sealing action. The outlet port 419 of the inlet-compression volume 400 is in communication with the inlet of a rotational combustion chamber flow controller device (CCFC) 421. At the end of the compression cycle the compressed fluid is trapped and sealed inside the volume of the CCFC device 421 due to the coordinated motion of its rotor 422 that blocks the outlet port 419. As the rotor 422 continues to rotate, it delivers the compressed fluid to the opposite side of the CCFC where a fuel injector 423 injects a controlled amount of fuel that is ignited by the compressed fluid temperature.

A glow plug 403 is installed in order to support a cold start. Fuel injection is timed so that combustion starts at the point that the front running apex of the engine rotor 402 (corresponding to face B in this particular drawing) has completely passed the inlet port 418 of the work-exhaust volume 480. As the engine rotor 402 continues to rotate by means of the eccentric shaft, the stator gear and rotor gear 407 due to combustion pressure over its face B, face A performs an intake cycle and face C performs an exhaust cycle. The CCFC rotor 422 rotates concurrently with the engine rotor 402 in such a way that each face of the engine rotor works against a face of the CCFC rotor in a cyclic motion. A turbo-compressor turbine inlet is in communication with the exhaust port 408 and is fed by the exhaust gases, which in return drive a flow compressor 415 that supports the intake cycle with pressurized fluid through intake port 409. As clearly seen, the apex of the engine rotor 402 performs a complete scavenging of the volume and exhaust gases cannot mix with intake charge due to buffer seal 404'.

The charging (intake) cycle is continuous, without any interruption in flow. Compensation for overlap between exhaust port 408 to inlet port 409 is unnecessary since the fluid communication between the two ports is completely blocked by the buffer seal 404'.

A complete cycle starts at the flow compressor 415 intake 420 and ends at the turbine exhaust outlet 430. The work sector starts at the point where the inlet port 418 of the work volume 480 is completely passed by the relevant apex of the engine rotor 402, which is about 15° to 18° after the intersection of minor axis 410 and the top buffer seal 404, in contrast to about 60-70° with respect to a prior art Wankel engine, as shown in FIG. 1. The configuration of the present invention advantageously adds about 42° to the working sector at this point, as well as a substantially equal addition towards the end of the working sector whereby the exhaust port 408 is to be exposed by the relevant apex of the engine rotor, at about 15° to 18° before the intersection of minor axis 410 and the bottom buffer seal 404'. All together, the effective work sector totals approximately 144°, in comparison to about 60° achieved with the prior art Wankel system as it seen in FIG. 1. It will be appreciated that the calculated work sector of the present invention is greater than the maximum work sector of prior art Wankel engine, which is only 60-70° since the corresponding volume does not increase after such a value. With respect to a prior art Wankel engine, the work sector of the engine of the present invention is actually doubled since the volume increases within a sector of 120°.

In addition, it can be clearly seen in the present invention that from beginning to end, the work cycle combustion pressure applies a force to the rotor which causes the latter to rotate in only one rotational direction. Since the combustion pressure is limited to the work sector defined by the buffer seal across the centerline of the minor axis, a unidirectional force is applied. A comparison to prior art system is given in FIG. 2 wherein it can be seen that the force applied by the combustion pressure at the beginning of the cycle induces rotation in equally opposed and negating rotational directions. The situation improves as the rotation continues until after about 60° where all the force is directed to the desired rotating direction, but then, the work cycle is near completion and the remaining pressure is negligible.

Figure 5:
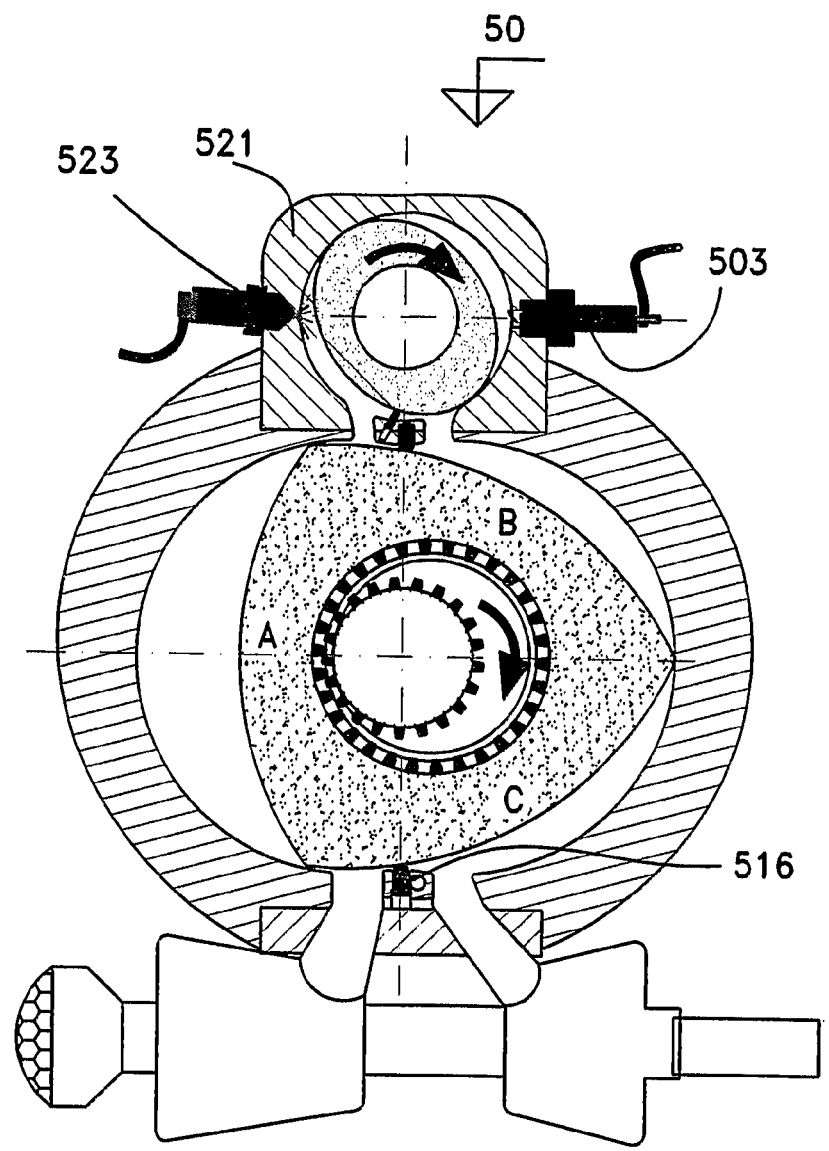
FIG. 5 is a cross-sectional drawing of a spark ignition engine, according to another embodiment of the invention.

FIG. 5 illustrates another embodiment of the invention in the form of a spark ignition (S.I.) engine, which is generally indicated at 50, and comprises all of the features described above including buffer seals 516, mutatis mutandis, with the following differences: A fuel injector 523 is situated at the CCFC 521 at its first chamber, at the compression side upstream to its combustion side, whereat a spark plug 503 is installed. The fuel injector is positioned at the compression side in order to leave time for effective mixing of the fuel and air prior to combustion. Additionally, the compression ratio of an S.I engine is lower than that of a C.I. engine.

Figure 6:
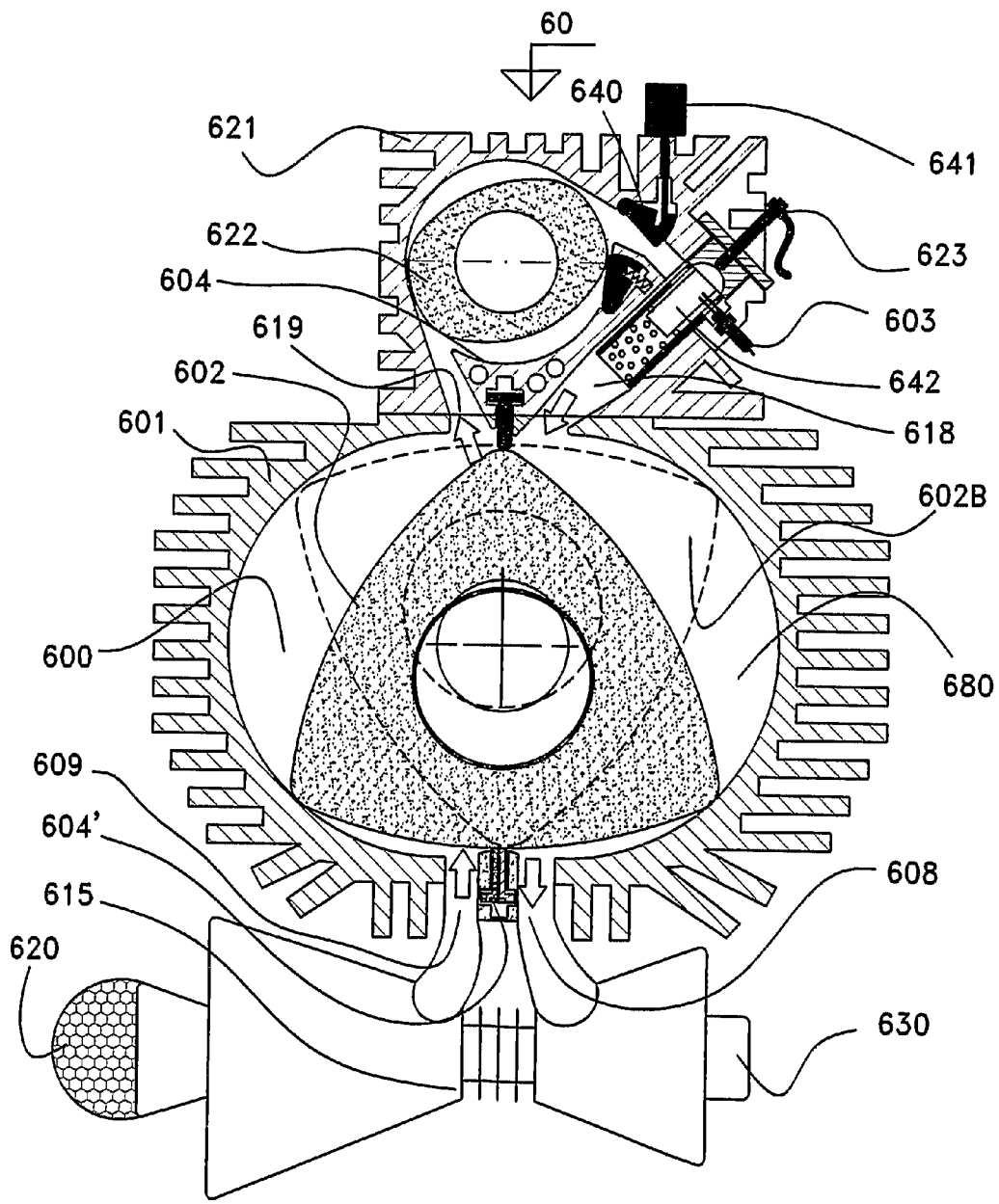
FIG. 6 is a cross-sectional drawing of a continuous combustion-flow engine, according to another embodiment of the invention.

With reference to FIG. 6, another embodiment of the present invention is illustrated in the form of a continuous combustion engine, which is generally designated by 60 and comprises all of the features described above, mutatis mutandis, with the following differences: The engine system of FIG. 6 comprises a rotor housing 601, optionally a multiple rotor housing that contains more than one rotor, buffer seals 604 and 604', potentially more of each in case of multiple rotor housing, in order to divide each housing into two separate volumes along its minor axis. One or more rotors 602 perform volume changes for the positive displacement cycles, as well as to use its peripheral contour for the constant contact with the buffer seals in order to perform a sealing action. A turbine inlet of a free shaft gas turbo-compressor 615 is pneumatically connected by its turbine to the exhaust port 608 of the work-exhaust volume 680 and the outlet port of its compressor is directly connected to inlet port 609 of the intake-compression volume 600. Turbo-compressor 615 has an air filter 620 and a turbine outlet (exhaust) 630. The function of the gas turbine compressor is to increase the fluid pressure that enters the combustor 642 so that increased efficiency and power output are gained. The inlet port of a flow-controller device 621 is mounted on top of the outlet port 619 of the intake-compression volume 600.

The compressed fluid (usually air) from the turbo-compressor 615 is further compressed inside the volumetric device of the engine and enters the flow controller 621 chamber and is transferred to the combustor 642 by means of rotor 622 that is synchronized with the engine rotor 602. Due to the synchronization, the rotor 622 serves also as a buffer, preventing the combustion pressure from returning upstream, back into compression sector. The delivered compressed fluid flows downstream towards the combustor via a flow regulator unit 640 that responds to an automatic airflow sensing system 641 in order to stabilize the airflow into the combustor 642. A fuel injector 623 and initial igniter 603 are installed in the combustor 642. Airflow data for fuel metering is supplied to the fuel injection system (not shown). The initial igniter 603 is only for the purpose of starting the engine, which later operates at a continuous combustion cycle. As the engine parts are effectively cooled, high operational temperatures can be supported such that substantial stoichiometric combustion can be achieved, thereby simplifying the design of combustor 642 and improving its efficiency and output in comparison to a gas turbine. Another improvement compared to a gas turbine is the high flexibility of the present invention due to the volumetric cycle and static pressure, resulting in operational characteristics that are similar to that of internal combustion volumetric engines, and at the same time having a power density, power to weight ratio and density compensation characteristics on the scale of a gas turbine. Additionally, the plurality of volumes, namely rotors, housings, etc. can contribute to a smoother engine operation and stability of fluid flow.

Figure 7:
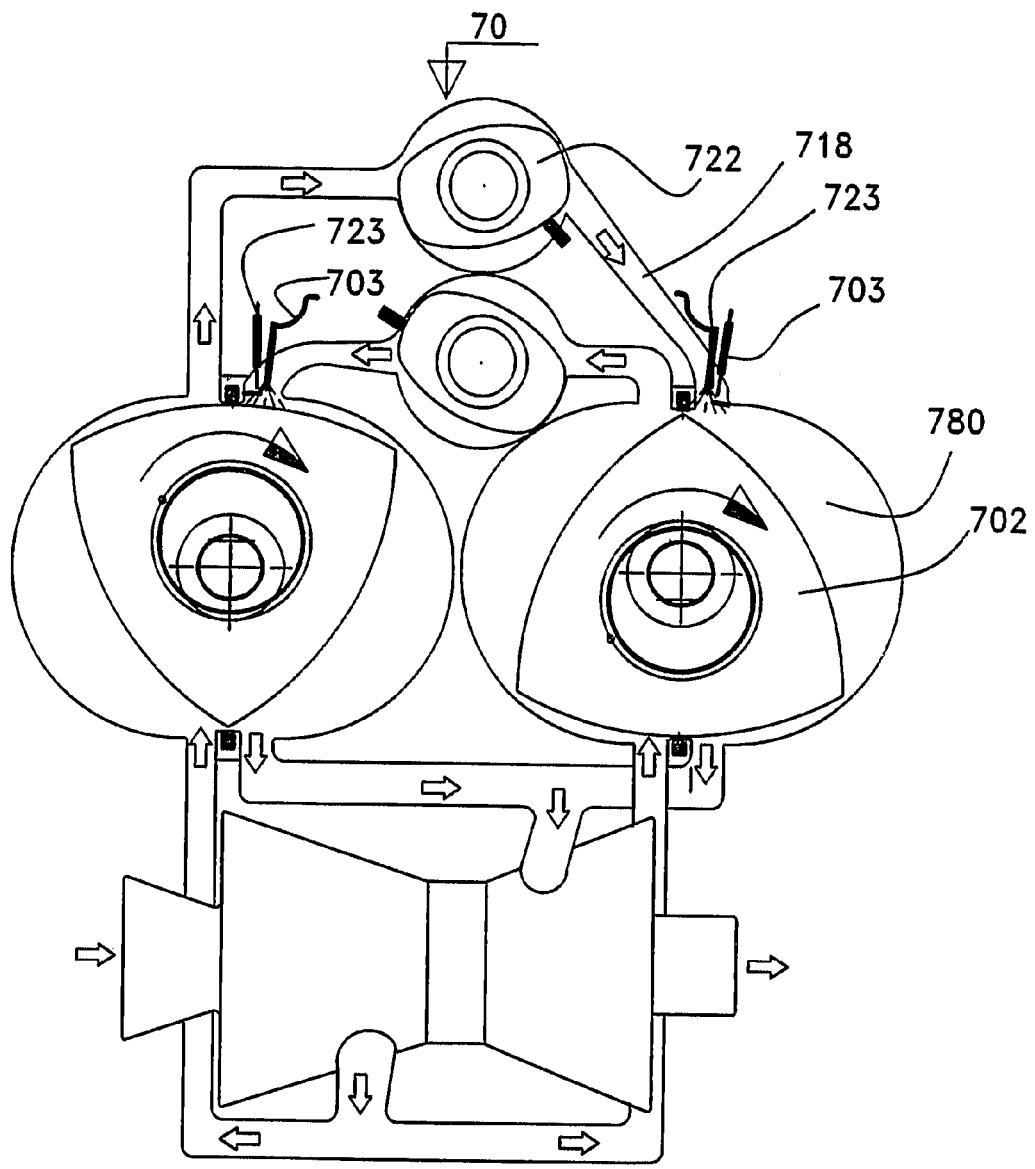
FIG. 7 is a schematic drawing of a continuous combustion flow engine having two rotors, two CCFCs, and a turbo-compressor.

FIG. 7 shows another embodiment of the present invention, which is generally designated by 70 and is a multiple rotor, continuous combustion flow engine, which is similar to engine 60 of FIG. 6, shown according to an exemplary arrangement. The operation and design principles suggested in FIG. 6 can be seen in FIG. 7 mutatis mutandis, wherein a plurality of rotors 702 are shown together with direct fuel injection by means of a corresponding fuel injector 723 and initial igniter 703 into the expansion volume 780, into which the corresponding discharge conduit 718 of CCFC 722 is introduced without any combustor due to a suitable ratio of fuel and air mixture.

Figure 8:
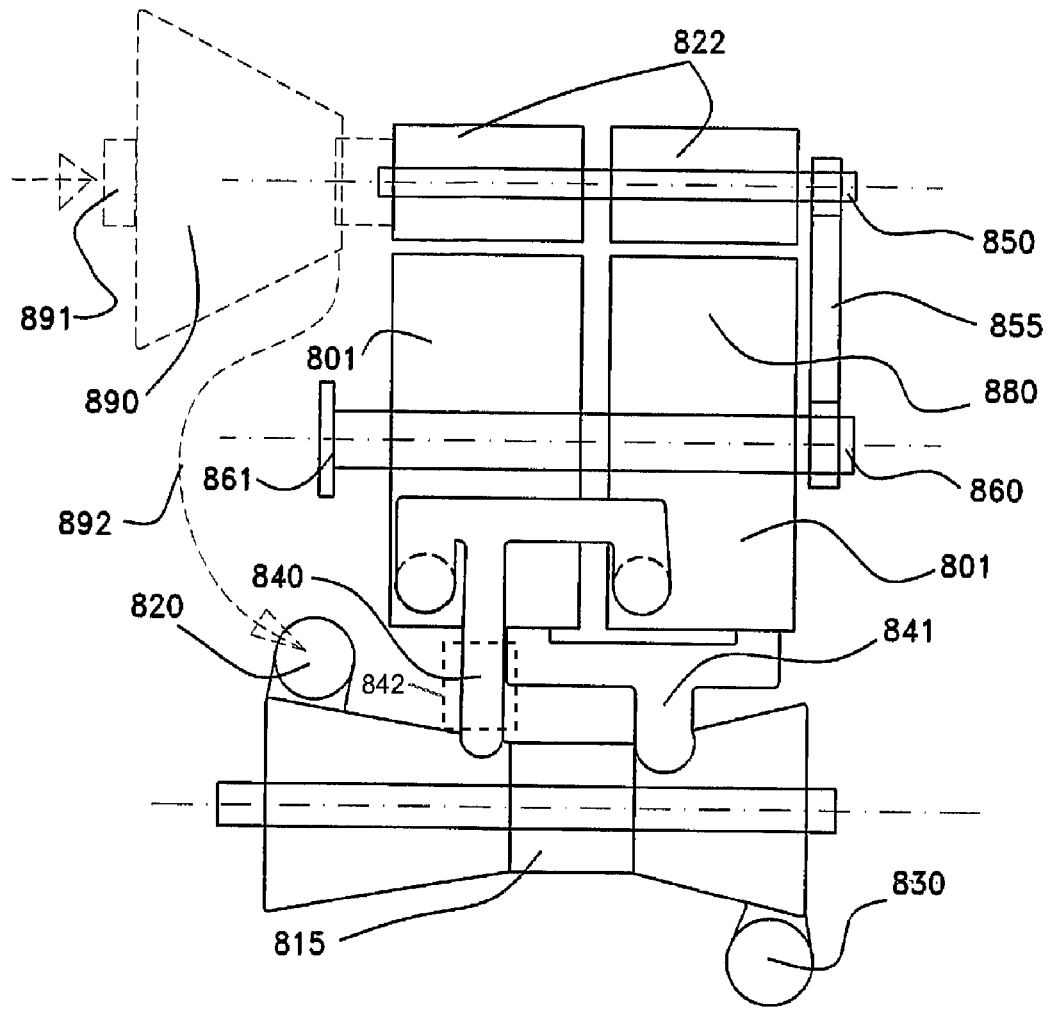
FIG. 8 is a schematic side view of the engine of FIG. 7, further comprising an engine shaft driven flow-compressor.

FIG. 8 is a schematic side view of the embodiment of FIG. 7 wherein an engine shaft driven, flow compressor 890 is added to the embodiment, thereby providing another embodiment of the present invention in order to create a multiple stage flow compressor for the purpose of increasing the pressure of the charged fluid.

Compressor 890 is marked by a dotted line, indicating it as an optional feature, since the volumetric units, according to the present invention, are capable of a very high compression ratio (higher than 70 at any K factor). However, a flow compressor is capable of delivering a much higher quantity of fluid, and therefore, in actual design, a combination of a volumetric compressor and flow compressor is feasible.

The cycle of the system shown in FIG. 8 begins at the intake 891 of the engine shaft driven, flow-compressor 890, which feeds the compressor of the free shaft turbine compressor 815, directly through conduit 892 or via an intercooler (not shown) through port 820. The compressor of the free shaft turbine-compressor 815 further compresses the fluid and delivers it directly to the volumetric device 801 through conduit 840 or via an intercooler 842 indicated by dashed lines in heat exchange relation with conduit 840. After further compression at the volumetric unit 801, the compressed fluid is delivered by the flow controller 822 into the combustor through the flow regulator (similar to combustor 642 and flow regulator 640 of FIG. 6).

Flow controller 822 is synchronized through its shaft 850 with the engine main shaft 860 by means of transmission 855. After expansion in the volumetric device at volume 880, the remaining pressure of the fluid enters the turbine of the free shaft turbine-compressor unit 815 via conduit 841, and a compression of the intake fluid is returned by the compressor. The burnt fluid is discharged to the atmosphere through the turbine outlet 830.

By employing such a flow engine embodiment, which is essentially a built-in multi-fuel system, applications considered heretofore as being not suitable for volumetric combustion engines, due to poor power to weight ratio, fuel type limitations, and sensitivity to altitude (density compensation), may now be feasible. Additionally, a high efficiency and output through a wide range of engine velocity, due to the volumetric cycle which occurs under static pressure, may also be achieved. Also, the components of the system that are effectively cooled may operate at a temperature much less than the maximum cyclic temperature. As a result, the cyclic temperature may be higher, thereby enabling a higher cyclic efficiency in comparison with a gas turbine.

With reference to FIG. 9, another embodiment of the present invention is described that demonstrates the way that improvements of the present invention can be adapted by prior art systems, in order to achieve higher performance, efficiency and better adaptability to common and new, potential, applications. An engine is generally indicated by 90, showing the adaptability of a low K factor (the ratio of the rotor radius to eccentricity). A low K factor is significant in terms of influencing the engine configuration since a lower K factor allows for a smaller engine size and weight for a given swept volume. With the benefit of a low K factor, drawbacks associated with a prior art Wankel engine, such as a low compression ratio and an excessively sharp lining angle of the apex seal over the internal contour of the rotor housing, may be overcome. Most prior art Wankel engines have a K factor which is higher then 6 (usually around 7 for S.I. engines and around 10 for C.I engines).

In FIGS. 9A-E, the rotor 902 and the rotor housing 901 are shaped in accordance with a K factor of 4, demonstrating an engine compactness that can be achieved. The active volumes are relatively large, the rotor shape is simple, and the rotor weight is less then rotors of a higher K factor with the same capacity. Furthermore, most of the rotor mass can be cooled by means of the large passage 959 formed in the eccentric shaft 953 while the far apex area is cooled by means of a narrow passage 952 formed in the vicinity of a corresponding apex of the rotor, thereby eliminating the mass flow of cooling oil inside large passages in the rotor, known as dynamic balance, as well as center rotor sealing problems, associated with prior art engines. An additional advantage of a low K factor is, surprisingly due to the larger eccentricity, which normally should decrease rotational velocity and increase torque, that the rotational velocity may be kept as high as, or even higher than, prior art engines with higher K factors while maintaining an increased torque, due to a significant decrease in the rotor mass.

Buffer seals 904 and 904' shown in FIGS. 9A-E are situated on the two ends of the minor axis, which is the axis dividing the internal epitrochoidal contour into two equal halves through its narrowest section corresponding to the central lobes.

In all embodiments of the present invention, the rotor is shaped in such a way that, while rotating, its circumferential contour as well as its apexes are permanently at a constant distance (gap) from the internal lobe tips of the rotor housing at every given point. As a result, buffer seal 904 and 904' that are situated exactly at those two points facing the rotor contour are in permanent contact therewith and are theoretically motionless. In a later depiction it will become clear that the pressure applied to the buffer seals is also constant and adjustable. In most of the embodiments of the present invention, the rotor is not equipped with apex seals due to two major factors. Firstly, when the relevant apex of rotor 902 passes CCFC outlet port 918 which leads from the combustion chamber to the work-exhaust volume, the rotor 922 of the CCFC device blocks any upstream backpressure through the combustion chamber and the inlet port 919 to the CCFC device. At the same time, the buffer seal 904 blocks any backpressure between the rotor housing volumes 900 and 980. Secondly, the gap between the rotor apex and the rotor housing can be made extremely small such that the apex is nearly in contact with the housing. The rotor 902 is equipped with side seals and the only possible gas leakage is at the small gap between the rotor apexes to the rotor-housing contour The outlet of the work-exhaust volume 980 is connected to the turbine side, inlet port of a high-pressure turbo-compressor (not shown) and as a result, every amount of downstream leaking gas is used by the turbo-compressor. This, in return, increases the inlet air quantity and pressure. In certain designs, a relatively wide gap should be made in order to achieve a higher part of the turbo-compressor in the charging process. As for the intake-compression volume 900, the narrowest possible gap should be allowed between the rotor apex tips and the rotor-housing contour, in order to minimize upstream leakage. In any case, leakage has very little significance since the fluid consists of clean air unmixed with fuel and is partially balanced by the relatively high pressure of the turbo-compressor. For the continuous-flow, continuous-combustion embodiments of the present invention the upstream and, downstream, leakages are of minor significance or of no significance at all due to the flow line of close to constant pressure from inlet port 909 to outlet port 908 of rotor housing 901. Nevertheless, an apex seal is shown for non-turbocharged systems (FIGS. 10A-C and FIG. 11D), which can cope with the passage over the buffer seals 904 and 904' at the rotor housing and vise versa, a buffer seal which can cope with the passage over the apex seal.

Figure 9A:
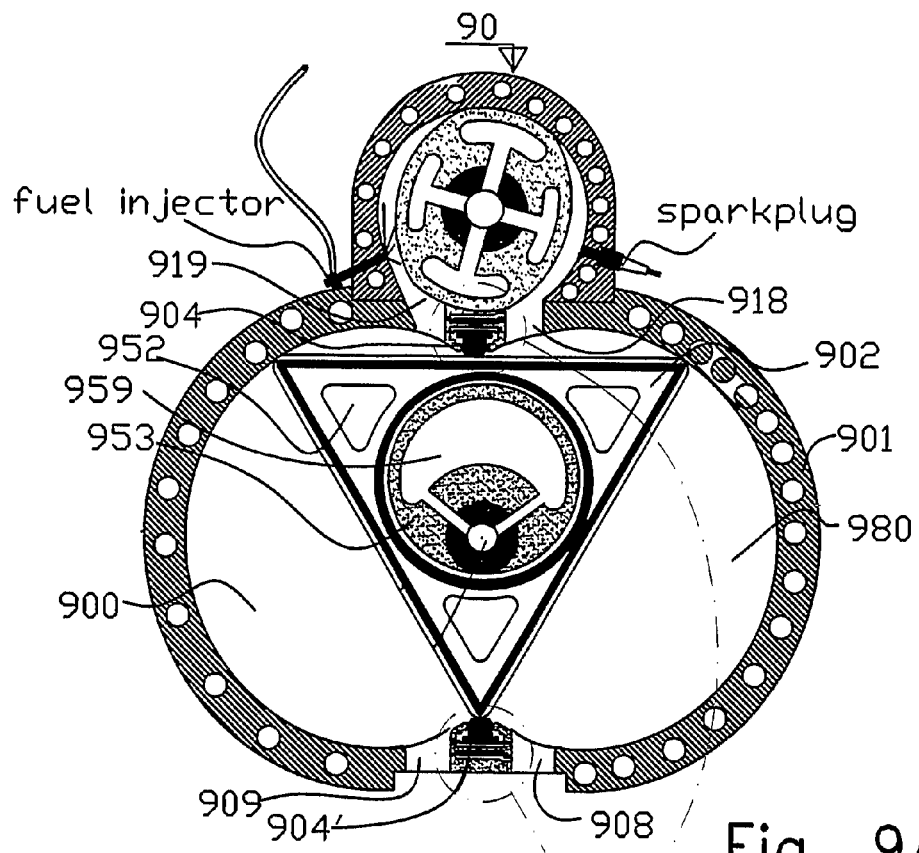
FIG. 9A is a cross-sectional drawing of an exemplary engine according to another embodiment of the invention, illustrating two of its inherent advantages: its adaptation to K factor as low as 4 without any affect on the compression ratio and its adaptation to the bounce damping system of the buffer seals by being disposed at the stationary housing of the engine.
Figure 9B:
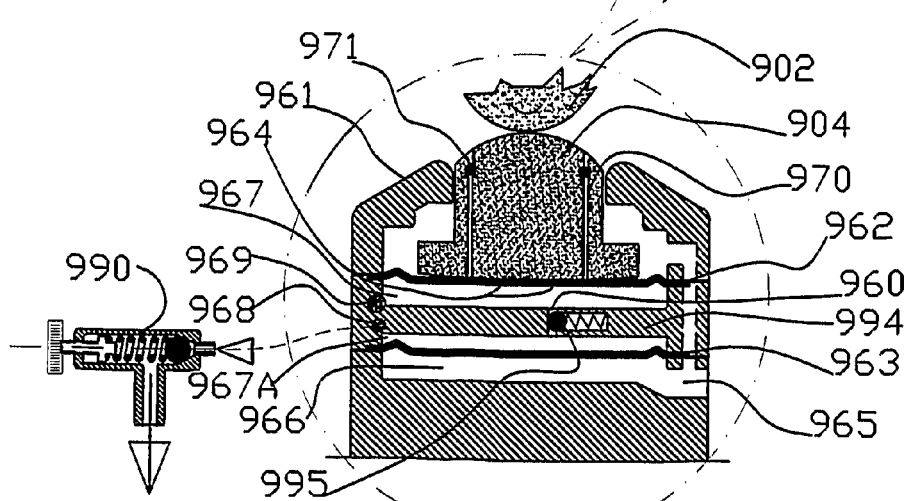
FIG. 9B is an enlarged drawing of the buffer seal bounce damping system of FIG. 9A.

An enlarged cross sectional view of the buffer seal 904 is shown in FIG. 9B. All of the principal components are shown, including the apex tip of the engine rotor 902 that is in contact with seal 904. The seal 904 is placed in its housing 961 and is guided by a linear slide path. The base of the seal is mechanically attached to a spring membrane 962 that is tightly affixed to the housing 961. A channel associated with the inner volume of the engine is formed above the membrane 962, and a chamber 967 is formed below membrane 962. A partition wall 964 separates chamber 967 from a similar chamber 967A directly therebelow. Chamber 967A is also blocked by a spring membrane 963 that is tightly affixed to the housing 961. A space 966 in communication with the inner volume of the engine by means of a drilled passage 965 is formed under the second membrane 963. A gauged drill 960 is formed within the partition wall 994 between the two membranes 962 and 963. The function of the drill 960 is to prevent the bounce tendency of the buffer seal caused by engine operation conditions, such as a wide spectrum of vibrations, sudden changes of speed and pressure, foreign solid particles etc. Oil is forced to pass between the two chambers through the small diameter hole that suppresses the tendency of the seal and spring membrane to bounce, resulting in a tighter and more stable sealing. In large engines with correspondingly large seals, a hole that is too small can cause a response by the seal that is too slow, which can cause mechanical damage, excessive wear and even breakage. A hole that is too large may not absorb the entire spectrum of possible vibrations. For bigger engines with bigger seals, a hole of larger diameter with spring loaded restrictor valves 995 will give the appropriate solution. An oil pressure inlet 969 is situated in the upper chamber 967 and an oil pressure outlet 968 is situated in the lower chamber 967A. Similarly, the inlet may be situated in lower chamber 967A and the outlet may be situated in upper chamber 967. The oil pressure outlet is connected to a pressure relief valve 990 that is adjustable or pre-adjusted and set to a pressure level that corresponds to the designed contact force of the seal with the peripheral surface of the rotor.

Oil enters into chamber 967 through inlet 969, flows into chamber 967A through hole 960 and then continue to flow out of chamber 967A through outlet 968 of the adjustable pressure relief valve 990. Oil circulation under regulated pressure cools the buffer seal and ensures permanent contact at constant pressure with the rotor contour. The pressurized oil in the chambers 967 and 967A also lubricates the seal tip. The seal can be made of porous synthesized metal through which the oil can penetrate to the seal tip end in such a way that a sufficient amount of oil will permanently lubricate the contact area between the buffer seal and the rotor contour. Membrane 962 is bored with small diameter holes 964 within a region thereof which connects the base of buffer seal 904, in order to enable pressurized oil to penetrate to the seal. Alternatively, if seals are not made of porous material, small drill holes 970 can be made to be used as conduits to transfer oil to the tip of the seal. The quantity of oil can be restricted by fixing restrict nozzles 971 inside the drills.

Figure 9C:
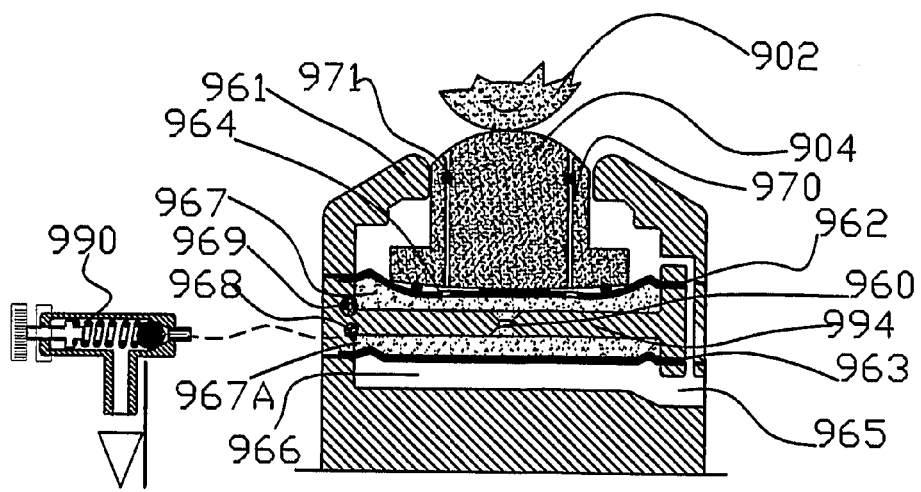
FIG. 9C is similar to FIG. 9B, illustrating the buffer seal at an initial position, prior to engine ignition, whereby its contact with the rotor contour is only due to the membrane preload spring force.

FIG. 9C illustrates the buffer seal assembly shown in FIG. 9B in a situation where the engine is not running and the seal 904 is loaded only by the preload tension of the membrane spring 962. This is a situation that is sufficient for the starting of the engine.

Figure 9D:
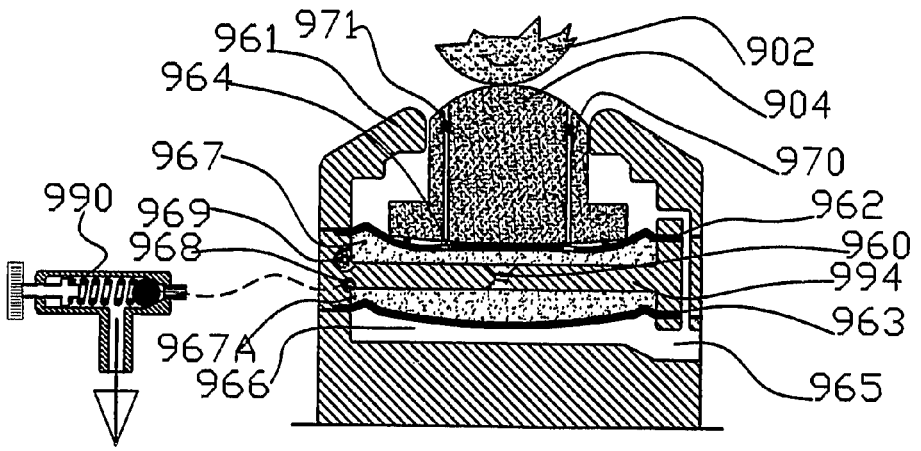
FIG. 9D is similar to FIG. 9C, illustrating the sealing action of the buffer seal, whereby pressure on the seal is achieved by means of oil pressure applied to the two chambers between the two membranes.

FIG. 9D illustrates the buffer seal assembly shown in FIG. 9B in a situation where the engine is running and oil pressure is supplied to chambers 967 and 967A. The oil pressure level is controlled by the relief valve 990, which determines the seal contact force with the rotor peripheral contour by controlling the pressure level. In practice, the pressure regulator can be located outside of the engine so that the contact pressure of the buffer seals can be controlled at any time, for development and testing purposes or for achieving the best performance in normal use.

Figure 9E:
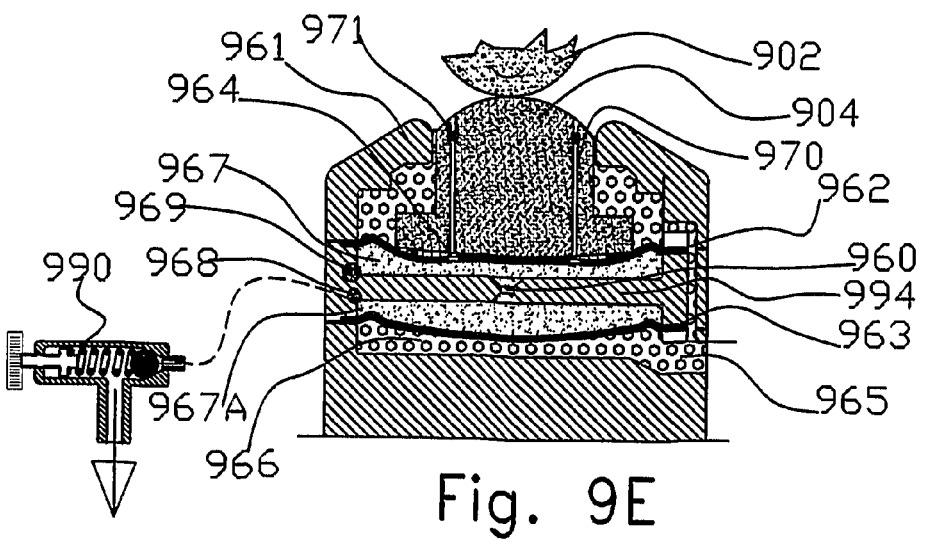
FIG. 9E is similar to FIG. 9D, illustrating a balanced contact force of the buffer seal with the rotor contour surface by applying the engine working pressure at the outer face of both of its membranes.

FIG. 9E illustrates how the contact pressure between the seal 904 and the peripheral contour of rotor 902 can be kept at a constant level by channeling the engine work pressure into both of its sides. The equalized pressure eliminates any influence of the engine internal pressure on the buffer seals contact pressure with the rotor regardless of the engine internal pressure level.

Figure 10A:
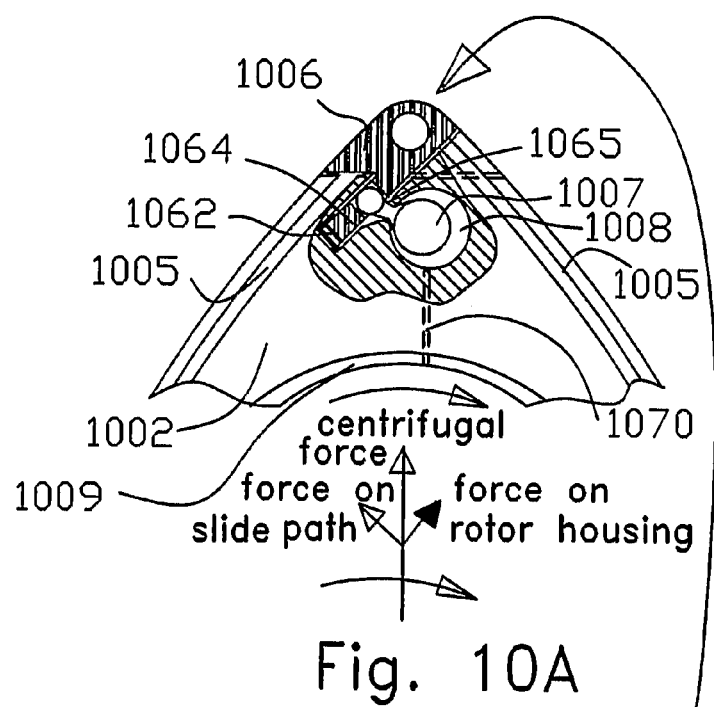
FIG. 10A schematically illustrates the configuration of an apex seal that can complement an engine having stationary rotor housing buffer seals, as well as a non-turbocharged engine, further illustrating the counterweight method for balancing the centrifugal force applied onto the apex seal and the vector split force method for reducing the centrifugal force applied onto the rotor apex seals.
Figure 10C:
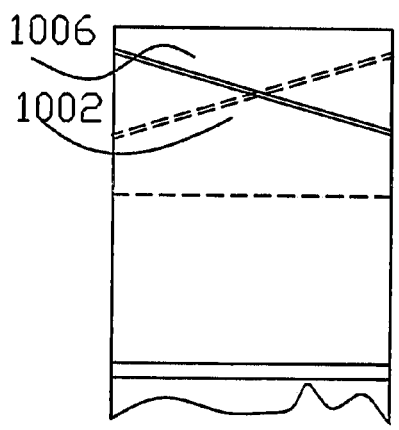
FIG. 10C is a front view of the rotor apex of FIG. 10A and the assembled seal.

With reference to FIG. 10A, an embodiment of the rotor apex seal is shown which is desirable in conjunction with normally aspirated engine systems (i.e. without a turbo-compressor) but can also function with every other embodiments described above. The outer part of seal 1006 is shaped as an integral part of the engine rotor 1002 apex and capable of sliding in and out as needed to achieve the permanent contact with the rotor housing inside contour and to retain contact with rotor side seals 1005. The outer congruence between the seal boundary to the rotor is beveled as can be seen in FIG. 10C, which is a front view of the rotor 1002 and the apex seal 1006. The beveled congruence is so utilized in order to ensure that the apex seal passes over the stationary buffer seal in a "sliding" point of contact rather than at a full transverse contact. The apex seal of FIG. 10A is also designed to eliminate the centrifugal force effect, using two different means, which can be combined, or used separately.

One means for preventing the influence of centrifugal force is the guide 1064. The plane of guide 1064 is inclined toward the rotational direction of the engine, in relation to the radial axis 1070 of the rotor 1002 as shown. In this situation, the centrifugal force that acts on the apex seal is split into two vectors. As shown in FIG. 10A, one vector forces the seal towards the ejection direction and the other forces the apex seal slide block 1066 in the direction of the wall of the guide 1064. If the inclination angle of the guide 1064 is, for example 45°, then the force is split into two equal vectors, which means that only 50% of its total value becomes an effective contact force on the seal. The inclination angle of apex seal 1006 in the direction of rotation eases the retreat of the apex seal when needed during operation and eliminates the sizing effect that occurs with perpendicular apex seals. A flat undulated spring 1062 situated under the apex seal supplies the basic contact pressure.

The centrifugal force upon the apex seal increases as a squared ratio of the velocity, and at high engine velocity the centrifugal force can reach a destructive level even with use of the aforementioned inclined guide 1064. The solution for a total balance of the centrifugal force is by means of a counterweight. A counterweight 1007 is inserted within the cavity 1008 having a pivot line (fulcrum) 1065. The counterweight 1007 is engaged with the apex seal-sliding block 1066 by means of lever arms 1068 that extend toward the other side of the pivot line (fulcrum) 1065. The lever arms 1068 are inserted into corresponding holes 1060 of the apex seal-sliding block 1066, as shown in greater detail in FIG. 10B, and protrude from the pivot line 1065 when the engine is idle. When the engine is in operation, the lever arms 1068 are forced towards the pivot line 1065 and the counterweight 1007 is held in place within the longitudinal walls of cavity 1008. The counterweight 1007 can move inside the cavity 1008 in two directions, namely, radial motion along radial axis 1070 towards and away from the center point of the rotor. As the rotor 1002 rotates at any given speed, the apex seal 1006 and the counterweight 1007 rotate together, reaching centrifugal force of similar value and in the same direction. As the counterweight 1007 coincides with fulcrum 1065, all of its centrifugal force beyond the fulcrum 1065 is forced towards the opposite direction and transferred to the apex seal 1006 by means of the lever arms 1068 and their respective holes 1060. The desired work pressure can be applied to the apex seal by one or more of the following factors: spring pressure, oil pressure or engine work pressure.

Figure 10B:
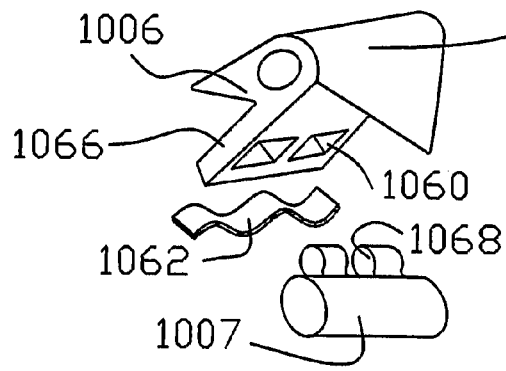
FIG. 10B is a perspective view of the principle components of the apex seal of FIG. 10A.
Figure 11A:
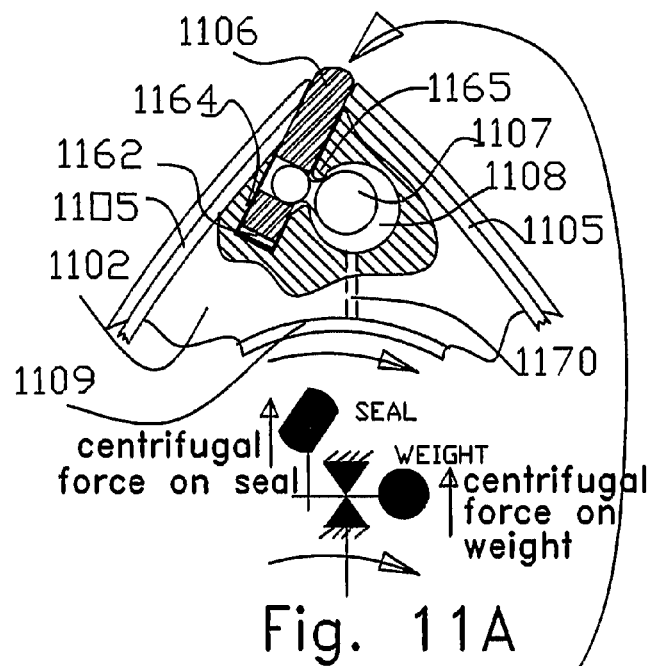
FIG. 11A illustrates a configuration of an apex seal having a rectangular apex seal.
Figure 11B:
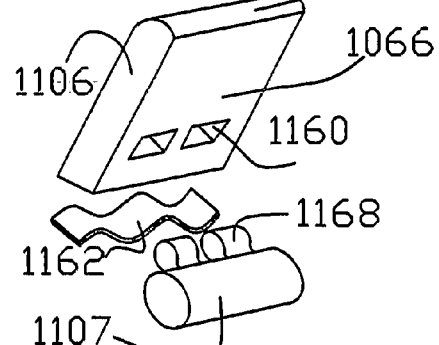
FIG. 11B is a perspective view of the principle components of the apex seal of FIG. 11A.
Figure 11C:
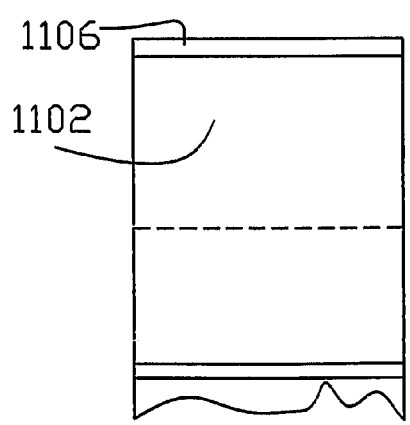
FIG. 11C is a front view of the rotor apex of FIG. 11A and the assembled seal.

With reference to FIGS. 11A-C, another embodiment of the apex seal is shown and comprises all of the features described in the previous embodiment (FIGS. 10A-C) mutatis mutandis, including rotor side seals 1105, counterweight 1107, counterweight cavity 1108, and apex seal guide 1164 being inclined toward the rotational direction of the engine relative to the rotor radial axis 1170, with the following differences: In FIGS. 11A-C, the apex seal 1066 is flat and rectangular, similar to a prior art apex seal shape. The counterweight 1107 is engaged with the flat apex seal-sliding block 1106 by means of lever arms 1168 that extend toward the other side of the pivot point (fulcrum) 1165. The lever arms 1168 are inserted into corresponding holes 1160 at the apex seal-sliding block 1106. A flat undulated spring 1162 situated under the apex seal supplies the basic contact pressure.

Figure 11D:
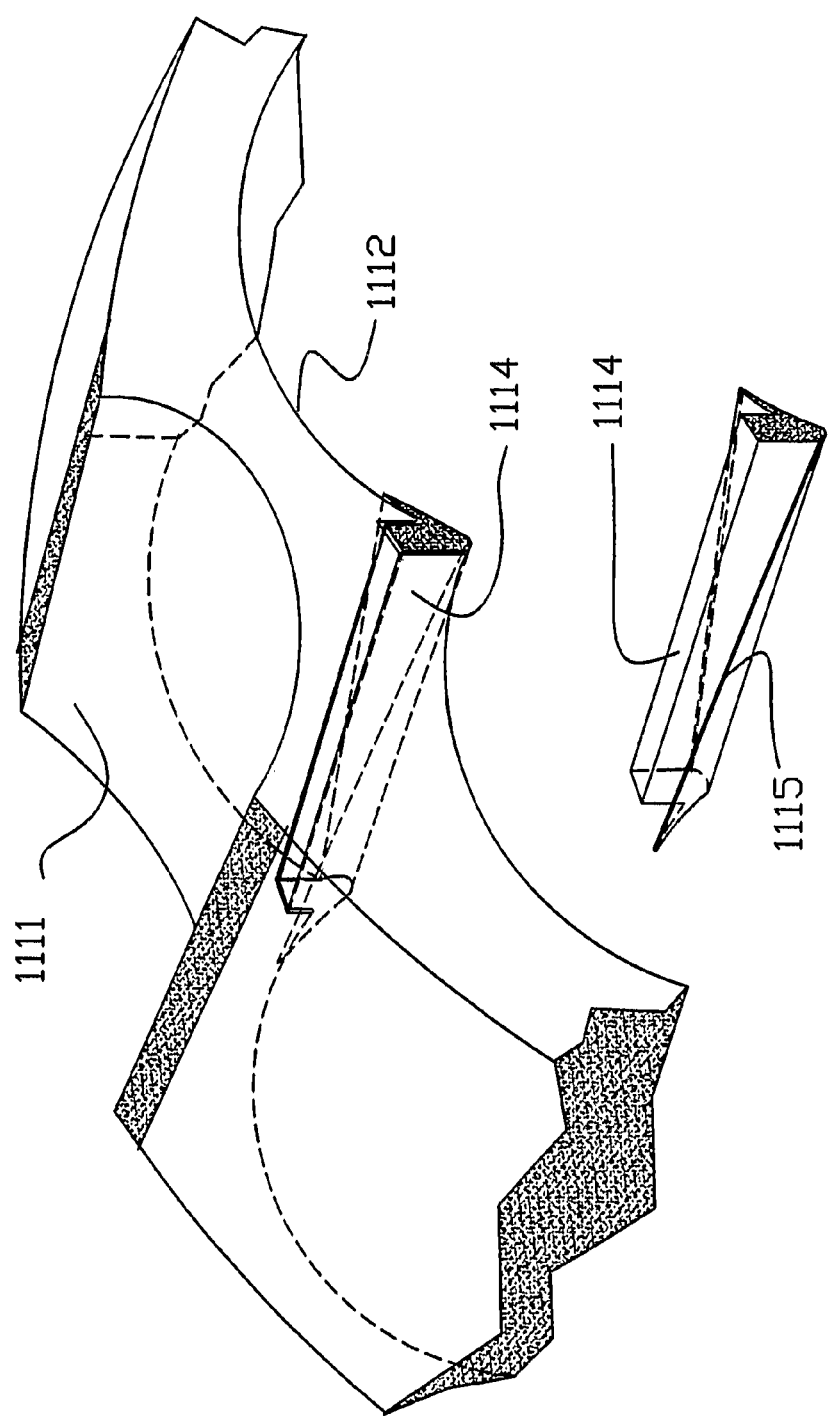
FIG. 11D is a perspective view of an apex seal of FIG. 11A which is disposed in the stationary minor axis and serves as a buffer seal.

FIG. 11D shows the embodiment of a buffer seal which functions in a similar way as the rotor apex seal of FIGS. 10A-C. A cavity 1111 formed in rotor housing 1112 within which the CCFC is placed is also shown. The outer part of seal 1114 is shaped as an integral part of the engine minor axis lobe of the rotor housing 1112 and capable of sliding in and out as needed to achieve the permanent contact with the rotor contour. The outer congruence between the seal boundary to the minor axis lob is beveled as can be seen on the seal 1114 as in its separate drawing. The bevel 1115 of the seal is in congruence with the bevel in the housing and it is so utilized in order to ensure that the apex seal of the rotor passes over the stationary buffer seal in a "sliding" point of contact rather than at a full transverse contact.

FIGS. 12A-F shows a rotary volumetric displacement device generally designated by numeral 120, which overcomes the disadvantages involved with the complex eccentric rotational motion of prior art Wankel rotary engines. The embodiment depicted in FIGS. 12A-F schematically illustrates each rotor of a fully rotational concentric volumetric displacement device that complements the improvements described above mutatis mutandis.

Figure 12D:
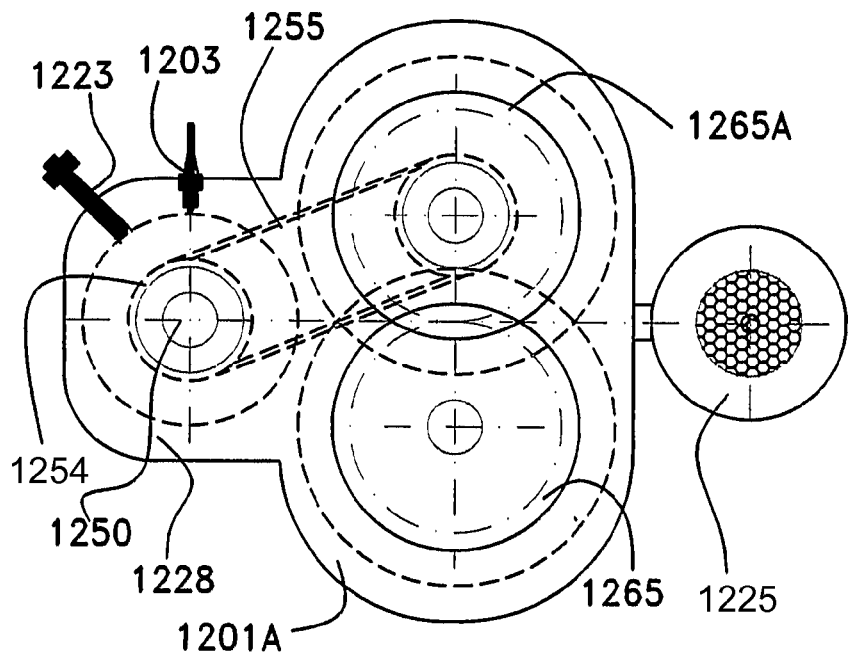
FIGS. 12D and 12E are schematic front and side views, respectively, of the engine of FIG. 12A.
Figure 12E:
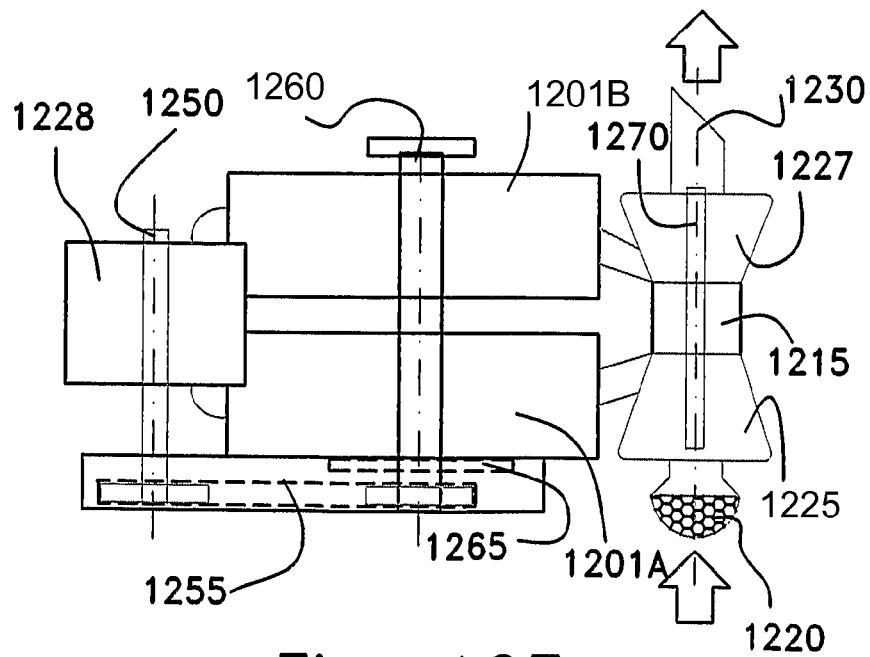

The engine shown in FIG. 12A comprises a housing 1201A that accommodates the intake compression volume 1200, a housing 1201B that accommodates the work (expansion)-exhaust volume 1280, a shaft 1260A that carries rotor 1202A at one end and rotor 1202C at the other end, wherein rotor 1202A and rotor 1202C are in an opposite orientation and rotate about shaft 1260A. A second shaft 1260B carries another pair of rotors, rotor 1202B at one end and rotor 1202D at the other end, wherein rotor 1202B and rotor 1202D are in an opposite orientation and rotate about shaft 1260B. A CCFC 1228 is placed between housing 1201A and housing 1201B, alongside the rotor housing at a parallel axis, or within the engine rotor housing while sharing the same central engine rotor shaft. The CCFC unit is situated on the top of the two housings so that the outlet port 1219 of housing 1201A is in communication with the inlet of the CCFC unit 1228 and inlet port 1218 of housing 1201B is in communication with the outlet port of the CCFC unit 1228. A front schematic view of displacement device 120 is shown in FIG. 12D, and a side view of the same is shown in FIG. 12E. Inside the CCFC unit 1228, an oval shaped rotor 1222 concentrically rotates about shaft 1250 in synchronization with shaft 1260A and shaft 1260B, which are also mutually engaged by means of gears 1254, 1265 and 1265A and timing belt or chain 1255. Fuel is sprayed into volume 1226, which serves as a combustion chamber, by means of injector 1223 and is ignited by the temperature of the compressed air when a C.I. engine is employed or by sparkplug 1203 when an S.I. engine is employed. As combustion occurs at volume 1226 of CCFC unit 1228 and expansion occurs at work-exhaust volume 1280, volume 1229 is charged with a fresh charge of compressed fluid continuously in a cyclic process.

In order to prevent the burnt gases in volume 1226 and volume 1280 from returning to the compression bank of the device a seal 1204 is situated at the downstream end of the volume 1226 (FIG. 12A). The operating pressure for the seal 1204 is obtained from the engine lubrication system, whereby oil pressure supplied through the drill hole 1262 is delivered to plunger 1263, which is connected by means of a connecting rod 1264 to seal 1204, as shown in FIG. 12B. Alternatively, a spring-loaded seal by means of spring 1266, or a combination of spring 1266 and oil pressure can be used. A turbo-compressor 1215 having a shaft 1270 (FIG. 12E) is added to the device in order to increase output and efficiency. Inlet port 1241 of turbine 1227 is in communication with exhaust (outlet) port 1208 of work-exhaust volume 1280, whereby exhaust gases are discharged into the turbine 1227 which in turn drives the compressor 1225 that charges volume 1200 through conduit 1240. The complete cycle begins at the intake 1220 of compressor 1225 and is completed at the outlet 1230 of turbine 1227.

FIG. 12C shows a centrifugal band seal system of this embodiment, for the sealing of the two rotors. An arc shaped metal seal 1298 is inserted into cavities 1299 and 1299A formed within rotor 1202 in such way that most of its weight is suspended over the rotating center of shaft 1260. During rotation, seal 1298 is forced out of the center due to centrifugal force. The movement of the seal causes contact with the rotor circumference and causes sealing to take place. Similarly seal 1298 is mounted on rotor shafts 1260A and 1260B, within cavities formed within each rotor, in order to achieve an effective sealing operation.

Further advantages of the embodiment shown in FIGS. 12A-E include:
a) a work sector of 180° in contrast to a work sector of 60° for prior art Wankel rotary engine;
b) two work cycles of the present embodiment are achieved from a full rotation (360°) of the engine, as opposed to one work cycle for one rotation (360°) of a prior art Wankel rotary engine;
c) a fully concentric rotation takes place which simplifies the design and construction of the engine and eliminates serious balancing problems and engine speed limitations, in contrast to prior art Wankel engines which have an eccentric shaft resulting in complex motion of the geared rotor; and
d) the engine shaft and the rotors rotate at the same speed in the present embodiment, while the engine shaft rotates three times as fast as the rotor in prior art Wankel engines.

Figure 12F:
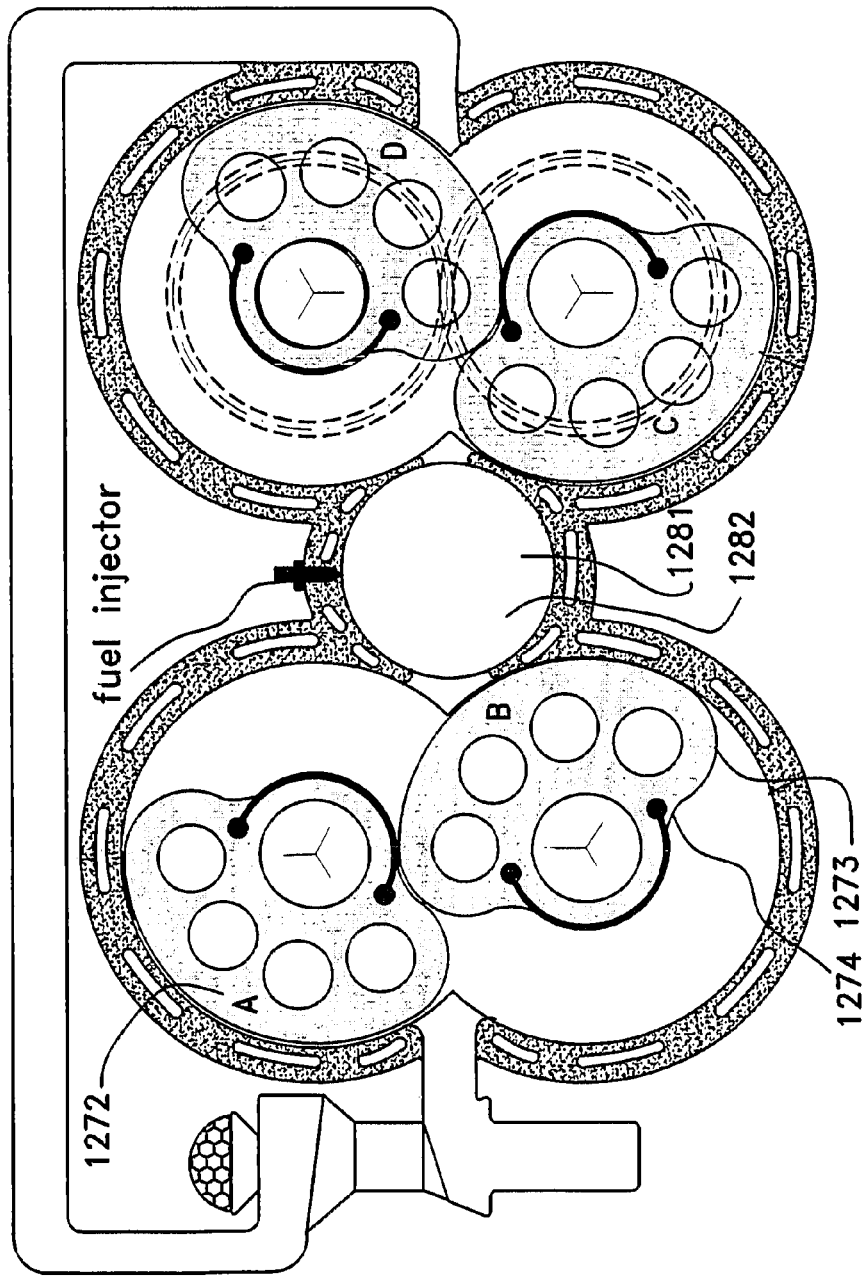
FIG. 12F is a schematic drawing of another embodiment of the invention, generally similar to the engine of FIG. 12A, showing rotors having at least one concave engagement portion and at least one convex engagement portion, for improved engagement and sealing.
Figure 13A:
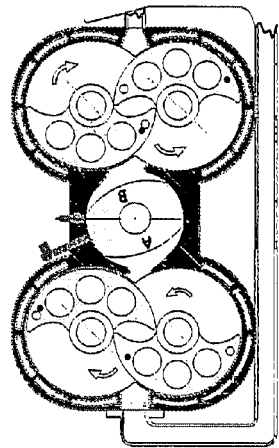
FIGS. 13A-I illustrate a nine-step cycle, respectively, performed with the engine of FIG. 12A, wherein each step illustrates an additional angular displacement thereof.
Figure 13B:
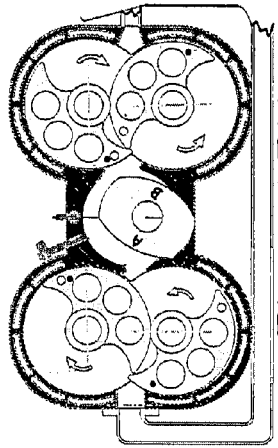
Figure 13C:
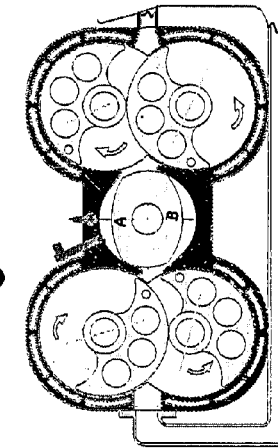
Figure 13D:
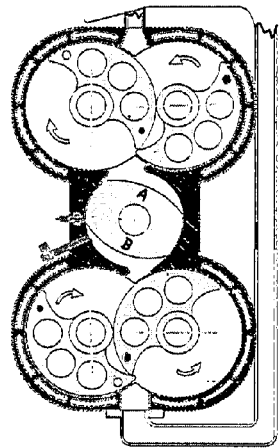
Figure 13E:
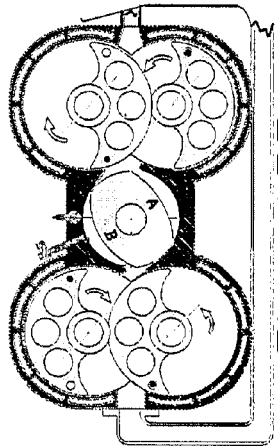
Figure 13F:
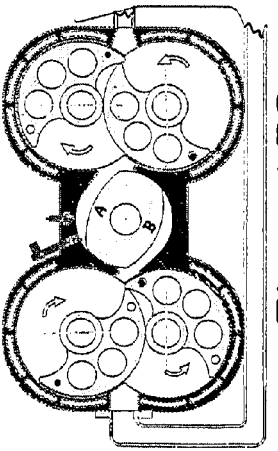
Figure 13G:
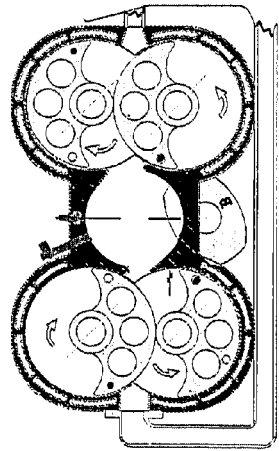
Figure 13H:
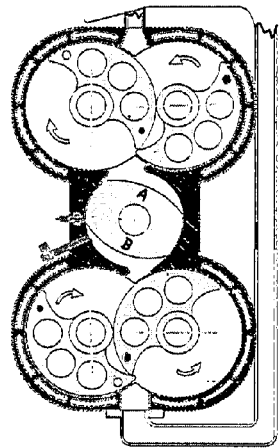
Figure 13I:
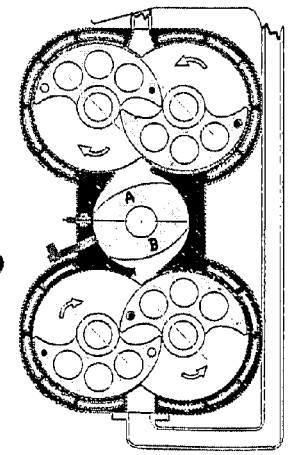

FIG. 12F illustrates an arrangement similar to the one described in FIGS. 12A-E, although the configuration of rotors 1272A-D of FIG. 12F is different than rotors 1202A-D of FIG. 12A. Each of the rotors 1272A-D is curvilinear and has at least one convex engagement portion 1273 and one concave engagement portion 1274, which are so shaped that a convex engagement portion 1273 of one rotor is adapted to be seated in a concave engagement portion 1274 of a corresponding rotor upon rotation of the two rotors. Accordingly, such engagement of two corresponding portions 1273 and 1274 constitute isolation means, by which fluid remaining between said two corresponding portions 1273 and 1274 is squeezed from the gap therebetween so as to prevent the mixing of a fresh charge with the residue of the previous charge. The rotors of FIG. 12F provide an increased sealing action since they have a much larger overlap sector as compared to those of FIG. 12A and they also allow a larger volume charge to be introduced than those of FIG. 12A, when the rotors of FIGS. 12A and 12F are of substantially equal length and width, due to the different shape of rotors 1272A-D which occupy a correspondingly smaller volume within the rotor housing. Also, the convex engagement portions 1273 of rotors 1272A-D of FIG. 12F have a shorter circumferential dimension than that of rotors 1960A-D of FIG. 12A, resulting in an increased open sector of the inlet ports so that an increased charge may be introduced into the rotor housing in order to utilize the additionally available volume. On the other hand, the rotors of FIG. 12A are capable of a higher compression ratio than those of FIG. 12F since a smaller unoccupied volume remains around the inlet port, as compared to the rotors of FIG. 12F. The designed compression ratio is nevertheless a function of the relation between the larger diameter to the smaller diameter of the rotor. Any compression ratio of modern S.I and C.I engines is easily achievable with the engines of FIG. 12A and FIG. 12F. Although CCFC 1281 is shown to have four concave walls 1282, it will be appreciated that the CCFC of FIGS. 12A and 12F may be embodied by any CCFC of the present invention, including a variable compression-ratio device.

FIGS. 13A-I demonstrates a nine step cycle of the embodiment of FIGS. 12A-F, wherein each of the steps A-I illustrates the angular displacement associated with sequential engine rotation of about 45°. For purposes of clarity, the arrows and the black spot at one apex of each rotor indicate the relative motion of each component of the engine.

Figures 14A, 14B:
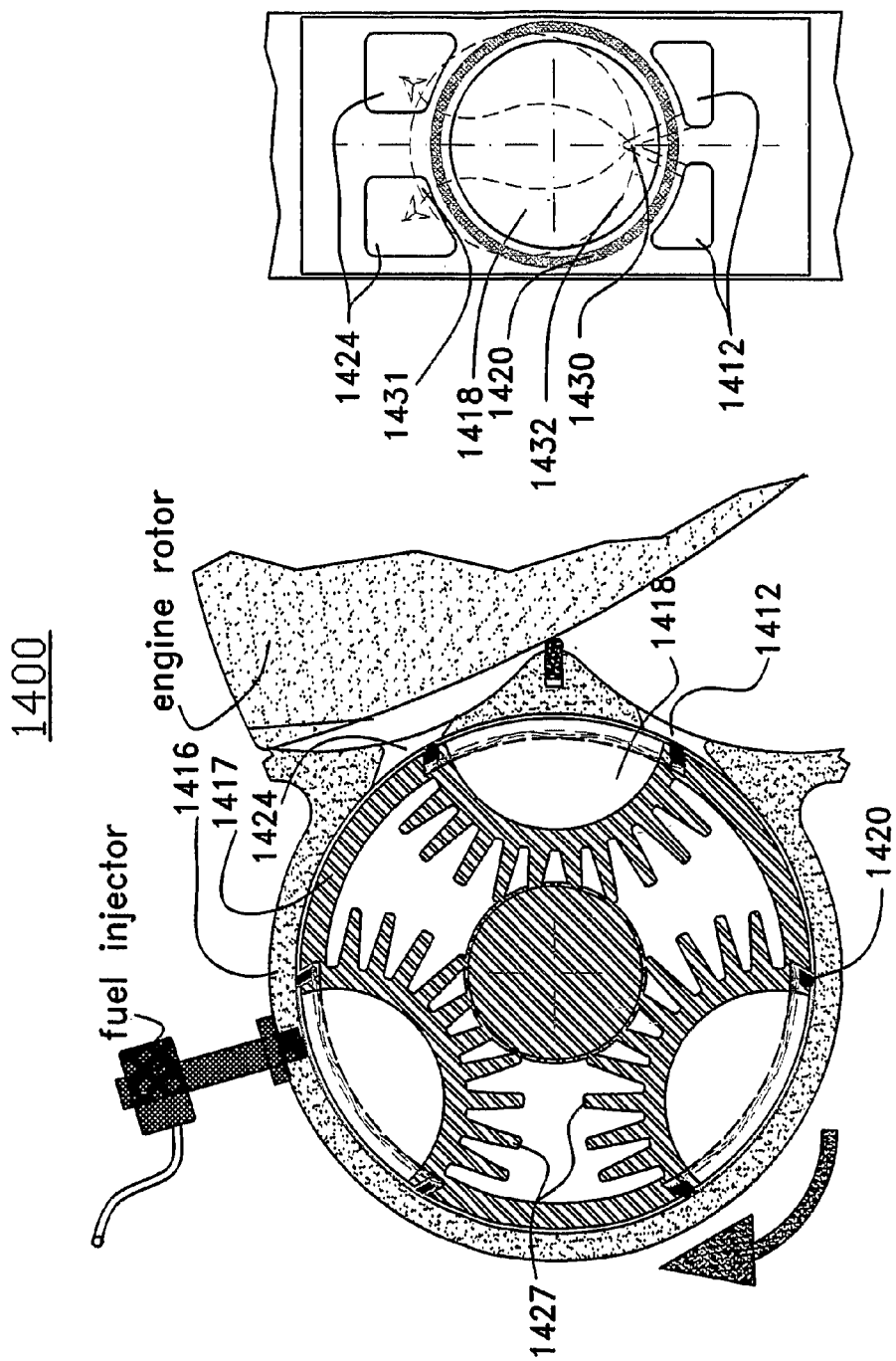

FIG. 14A shows an embodiment of a flow controller device generally designated by 1400 having 3 hemispherical combustion chambers 1418, one for each of the engine rotor banks. The chambers are equipped with cooling fins 1427 and are sealed by means of sealing rings 1420 in order to seal the gap between the rotor 1417 and the rotor housing 1416 around the opening of the combustion chamber.

FIG. 14B is a schematic side view of FIG. 14A, which shows the arrangement of the inlet ports 1424 and the outlet ports 1412 of the flow-controller device in order to explain how the remaining of the compression pressure can blow out the residual burnt gas from the combustion chamber 1418 within a narrow sector of overlapping at the end of the compression stroke and close to the end of the expansion stroke, corresponding to a time at which the compression pressure is higher than the expansion (work) pressure. A minor extension port 1430 from the outlet 1412 protrudes towards the inlet port 1424 to such a distance that enables a short overlap of the combustion chamber 1418 over the extension port 1430 and the small exposed area 1431 of the inlet port 1424. Since compression pressure is at its maximum level and the expansion pressure is substantially at its lowest level, a short blast of compressed air purges the residual combustion gas from the combustion chamber. This process occurs after the compression side of the combustion chamber is already charged and port 1412 is no longer exposed, so that the air which is used for the purging action may advantageously be the relatively small quantity which is trapped within outlet port 1412.

Figures 15A, 15B:
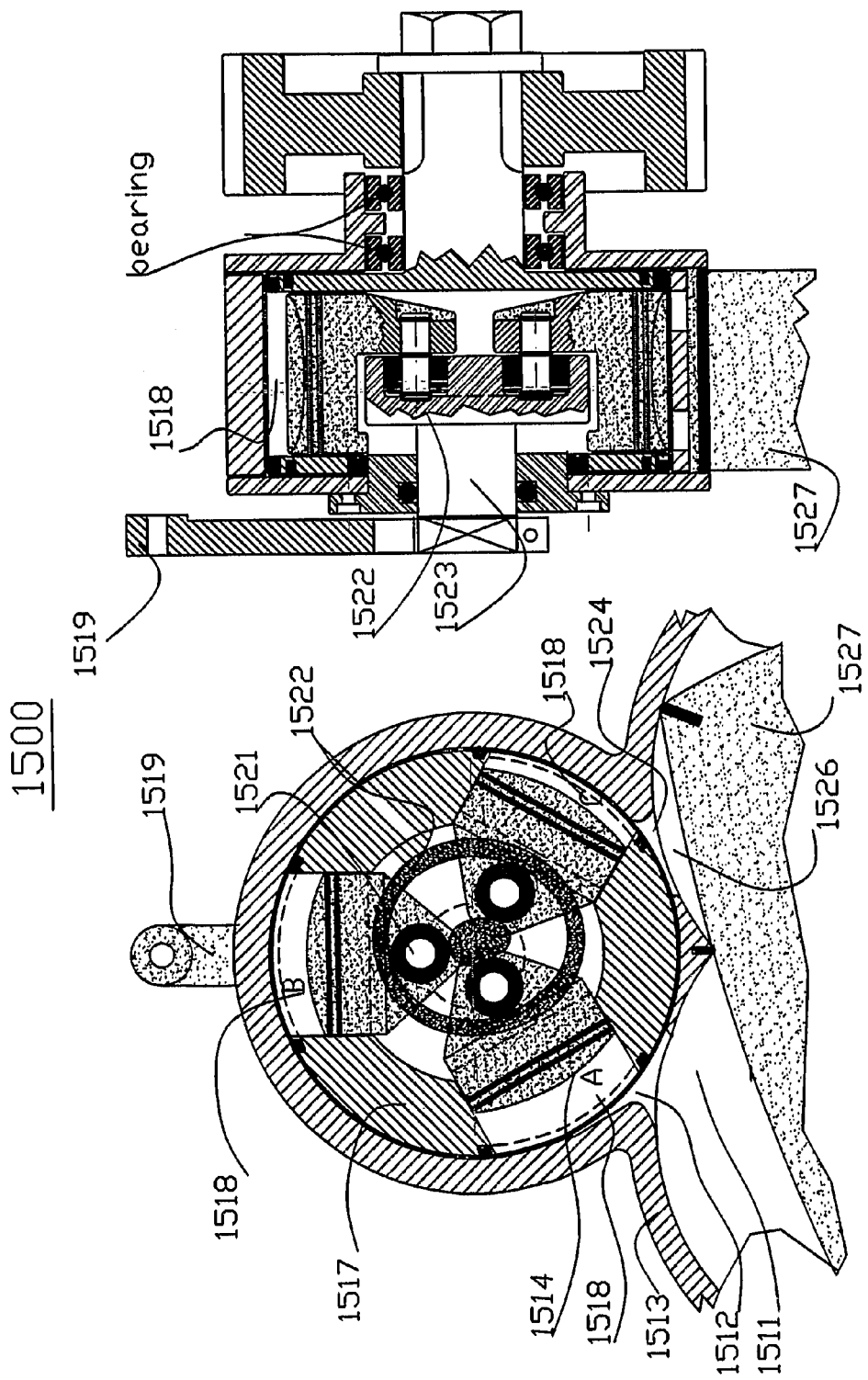
FIGS. 15A and 15B are partially schematic, cross-sectional front and side views, respectively, of a variable compression ratio CCFC in which the means for controlling the compression ratio is by a bi-directional cam and a cam follower.

With reference to FIGS. 15A and 15B another embodiment of a CCFC is illustrated. The illustrated CCFC designated by 1500 is capable of changing the compression ratio during operation, in response to the air density or any other considered factor such as fuel type, cold weather start, operation at very cold weather conditions etc.

The engine rotor 1527 rotates within the rotor housing 1513, e.g. in a clockwise direction as illustrated, and compresses air in the compression volume 1511. The compressed air is delivered into the corresponding combustion chamber, e.g. combustion chamber 1518A, of CCFC 1500 via its inlet port 1512. The volume of chamber 1518A is at its maximum value since the piston 1514 is at the bottom of its stroke. The stroke is controlled by means of a bidirectional (double walled) cam 1522 disposed substantially in the center of CCFC 1500 and of a cam follower 1521 integrally formed with the piston body at the bottom of each piston. As engine rotors 1527 and CCFC rotors 1517 continue to rotate, an engine rotor 1527 completes the compression stroke and the inlet port 1512 is closed by a flow-controller rotor 1517. As said flow-controller rotor 1517 continues to rotate, the corresponding piston 1514 is pushed by its cam-follower 1521 and cam 1522 towards the top of its cylinder, thereby further increasing the compression pressure. The pressure increase of combustion chamber 1518A is terminated when the outlet port 1524 leading to the expansion volume 1526 of the engine is exposed following subsequent rotation of a flow-controller rotor 1517 and the fluid content of the combustion chamber 1518A bursts into the expansion volume 1526.

The cam 1522 which causes the travel of the piston 1514 is mounted upon a centric shaft 1523. The said centric shaft 1523 is capable of performing clockwise and counterclockwise angular motion and is controlled by a lever 1519, or any other similar means which is controlled by automatic or manual apparatus having suitable sensitivity for controlling the motion of centric shaft 1523. When the lever 1519 turns the centric shaft 1523 and a cam 1522 in a counterclockwise advancing direction, the corresponding piston 1514 will move further toward the cylinder top before the outlet port 1524 will be exposed by the flow-controller rotor, causing the pressure inside the corresponding combustion chamber 1518 to increase. When the lever 1519 turns the centric shaft 1523 and a cam 1522 to a clockwise retracting direction, the outlet port 1524 will be exposed to the combustion chamber 1518 while the corresponding piston 1514 is in a lower position inside its cylinder, and therefore a lower pressure will be generated inside the corresponding combustion chamber 1518.

When a C.I. engine is employed, the fuel is injected into a combustion chamber 1518 at an optimal predetermined time to let it burn completely before being exposed to the outlet port 1524. The air pressure level at the time of fuel injection is of great importance with respect to cold start and regular operation, particularly when the ambient air is of low density, such as commonly found at high altitudes or during very cold weather conditions.

When an S.I. engine is employed, a spark ignites a mixture of air and fuel at an optimal predetermined time so that the entire, or a majority of, the mixture may undergo complete combustion before being exposed to the outlet port 1524. With respect to an S.I. engine, the compression ratio can be automatically adjusted in response to parameters such as the fuel octane ratio, air density and ambient temperature by means of a knock sensor, which can control the combustion ratio variation apparatus (not shown) adapted to operate lever 1519 in response to the aforementioned parameters, in order to maintain the engine at top performance without any risk of damage. CCFC 1500 is so designed that the apex of the cam 1522 leads the piston to the top of the cylinder. After a combustion chamber 1518 is exposed to the outlet port 1524, the piston 1514 continues to move upward in its cylinder until reaching the top thereof, causing all the burnt gas to be discharged from the combustion chamber. By this operation, two important goals are achieved: 1) all of the burnt air-fuel mixture participates in the expansion work producing process and 2) residual burnt gases do not remain in the combustion chamber at the commencement of a new cycle. As rotation continues, the piston 1514 is lowered within the cylinder by the external wall of cam 1522 in order to increase the combustion chamber volume to a maximum value in preparation to a new cycle.

FIGS. 16A and 16B illustrate another embodiment of a controlled compression-ratio CCFC, which is designated by 1600. CCFC 1600 functions similarly to CCFC 1500 of FIGS. 15A and 15B and have the same advantages. CCFC 1500 and CCFC 1600 differ in terms of the cam and cam follower configuration. Eccentric cam 1622 of FIGS. 16A and 16B is unidirectional, and is adapted to push a piston 1614 by means of the corresponding cam-follower 1621 only towards the top of its cylinder. A piston is returned downwardly by means of a corresponding set of preloaded springs 1630 and of the pressure of the compressed gas within the combustion chambers 1618. A piston is forced towards cam 1622 firstly by the compression pressure and subsequently by the combustion pressure. The gas pressure together with the applied load of the springs 1630 is adapted to overcome the centrifugal force acting on the pistons 1614 upon rotation of the rotor 1617. Also, FIG. 16B shows the way the pistons are arranged inside the rotor in an inclined angle α in order to minimize the general size of the whole flow-controller device. By inclining cam-followers 1621 with respect to a corresponding set of springs 1630, the pistons 1614A-C can be placed closer to one another, resulting in a more compact CCFC.

Similar to CCFC 1500 of FIG. 15A, the combustion ratio is controlled by the angular motion of the cam 1622, which is connected by means of shaft 1623 to lever 1619. A counter-clockwise angular motion of lever 1619 and cam 1622 will increase the compression ratio since the pistons of the combustion chambers will reach a higher point in the cylinder before the outlet port 1624 will be exposed, and vise versa, a clockwise angular motion of lever 1619 will decrease the compression ratio since the exposure of outlet port 1624 will occur when the piston 1614 is in a lower point in its cylinder. This description is valid only when the CCFC rotor 1617 and the engine main rotor are rotating in a clockwise motion. In case of counterclockwise rotation of said rotors, the operation of the engine is in an opposite sequence.

Figure 17:
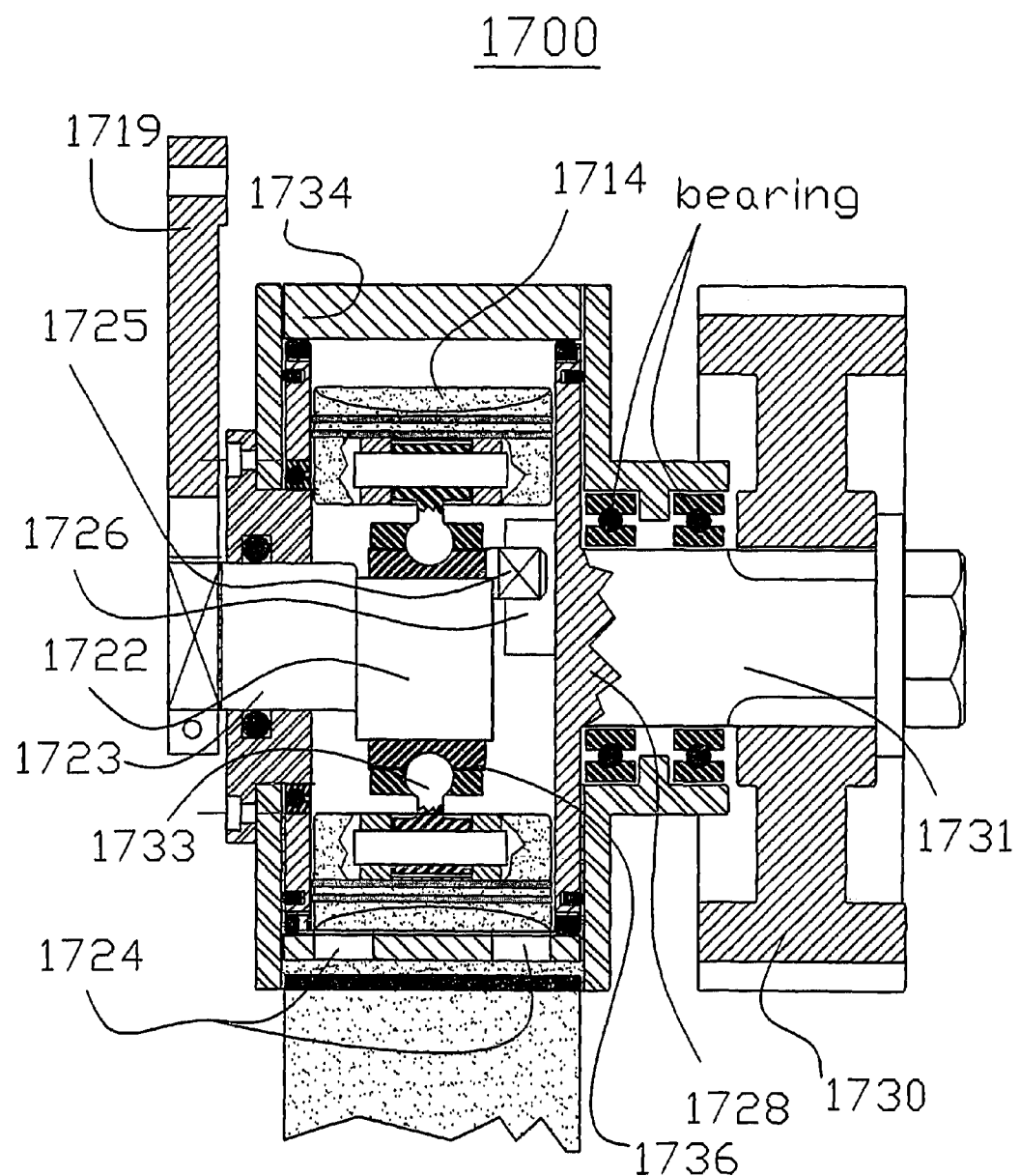
FIG. 17 is a partially schematic, cross sectional view of a variable compression ratio CCFC in which the compression ratio is controlled by means of an eccentric shaft and connecting rods.

FIG. 17 illustrates another embodiment of a controlled compression-ratio CCFC, which is designated by 1700. In this embodiment, the motion of the pistons 1714 within the corresponding cylinders of rotor 1728 is controlled by means of eccentric shaft 1729 and connecting rods 1733. The eccentric shaft 1722 is integrally formed with centric shaft 1723 disposed at substantially the center of CCFC 1700. While rotating within housing 1734, rotor 1728 causes hub 1736 to rotate by means of engagement finger 1725 in engagement with slot 1726 formed in the rotor 1728. This engagement is so arranged in order to enable a relative linear motion of the hub 1736 mounted on the eccentric shaft 1722 with respect to the rotor 1728 mounted on the centric shaft 1731. The centric shaft 1731 is driven by means of geared wheel 1730. Since the hub 1736 to which the engagement finger 1725 is attached rotates about eccentric shaft 1722 and rotor 1728 rotates about centric shaft 1731, a relative linear motion between the rotor 1728 and hub 1736, the length of which is substantially equal to the eccentricity of eccentric shaft 1722, results during each revolution of eccentric shaft 1722. Slot 1726 accommodates the linear motion of the engagement finger 1725. The pistons 1714 are connected to the hub by means of connecting rods 1733. While the rotor 1728 rotates together with the pistons 1714, the latter are also linearly displaced within the corresponding cylinders by a displacement of twice the distance of the eccentric value of shaft 1722. The mechanism is so arranged that the pistons are close to the upper part of the cylinder at around the sector it reaches the output port 1724. Any angular motion of lever 1719 of the centric shaft 1723 to which the eccentric shaft 1722 is connected will cause a change to the compression ratio in a similar fashion as the CCFC of FIGS. 15A and 16A.

FIGS. 18A and 18B illustrate an embodiment of the present invention in which the CCFC is attached in parallel fashion to the side of the main engine housing block. In this CCFC embodiment which is designated by 1800, the orientation of pistons 1814A-C is mutually parallel to the engine shaft 1823 and to the centerline of CCFC 1800. The cam 1822 causes a motion of the pistons 1814A-C in a direction parallel to the engine shaft 1823. The rotational direction of the flow-controller rotor 1817 is preferably in an opposite direction to the engine rotational direction, in order to utilize the rotation of the engine shaft 1823 to a maximum extent and to thereby provide for a maximum duration for each cycle. A geared wheel transmission may be used to synchronize the rotation of engine shaft 1823 and of flow-controller rotor 1817. The engine main shaft 1823 carries a geared wheel 1831 serving as the driving gear for the driven gear 1830 of the flow-controller rotor 1817. The cam 1822, which move the pistons by means of their corresponding cam followers 1821, is advanced and retracted by means of the lever 1819 and shaft 1842 in order to control the compression ratio, as described hereinabove with respect to the embodiments of FIGS. 15-17. CCFC 1800 is advantageous in terms of its compactness and its very small effect on the general engine size.

FIGS. 19A-C illustrate three different ways of driving the flow-controller rotor 1917. Regardless of the engine rotor and CCFC configuration, the transmission for driving flow-controller rotor 1917 is selected primarily based on the type of engine. As can be seen, the three different transmissions shown in FIGS. 19A-C, respectively, are adapted to reduce the speed of the engine shaft 1923, so that the CCFC shaft 1913 will rotate at an angular velocity equal to that of the engine rotor 1927, which is e.g. one-third of the velocity of engine shaft 1923. The reduced speed of the CCFC shaft 1913 may facilitate power output means of the engine. Each type of transmission can transmit power to additional components of the engine, such as oil pumps, fuel pumps, balancing shafts, etc.

The transmission 1912 of FIG. 19A is disposed at the rear of the engine shaft 1923, while the CCFC shaft 1913 extends in the opposite in order to drive a propeller, or any other suitable component, by means of coupling 1925. The transmission 1912A of FIG. 19B is disposed at the front of the engine shaft 1923. The transmission of FIGS. 19A and 19B is of a geared wheel type while the transmission 1910 of FIG. 19C is of a chain and sprocket wheels, or of a toothed belt and wheels.

Figures 20A, 20B, 20C:
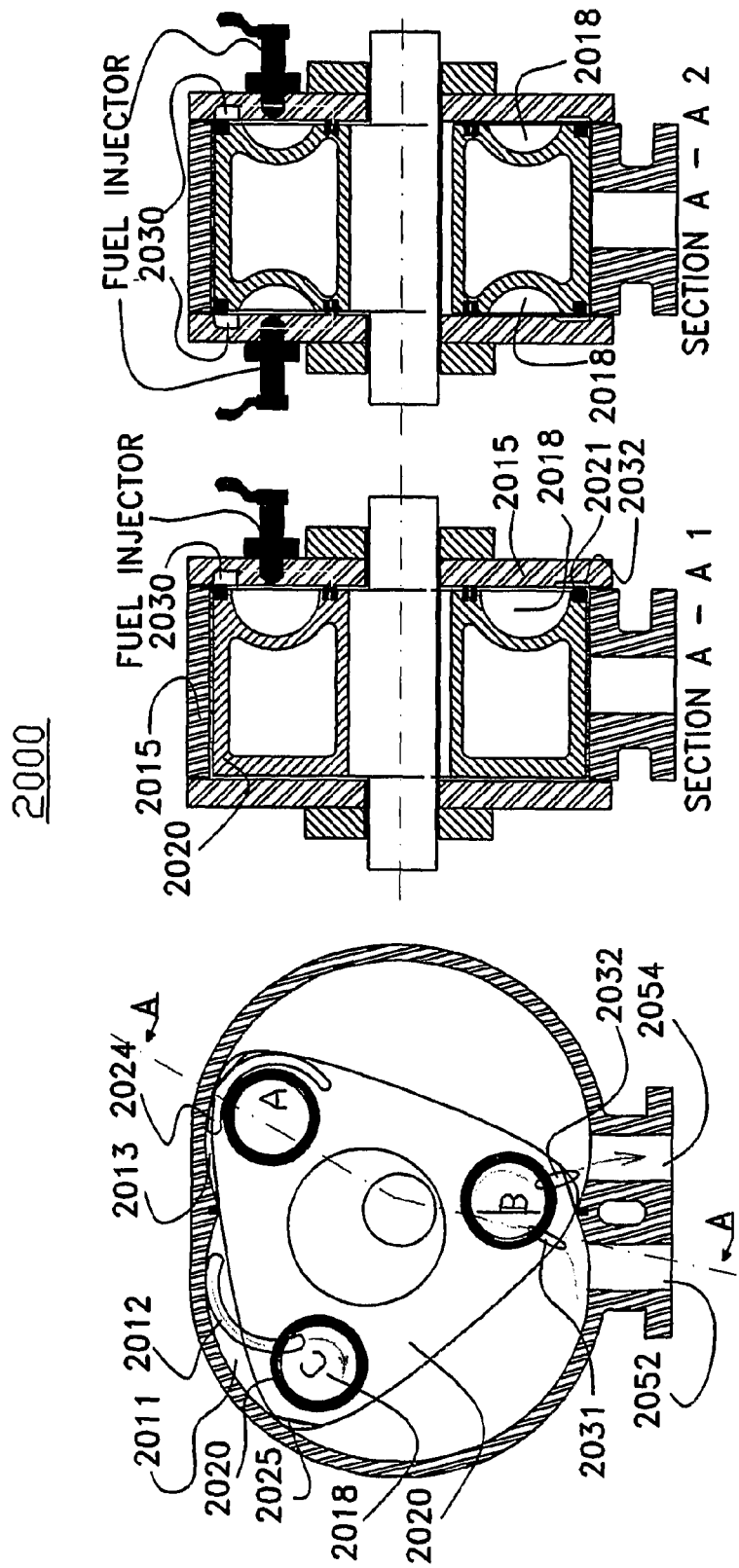

FIGS. 20A-C illustrate one of the preferred embodiments of an engine system, generally designated by 2000, in accordance with the present invention in which the CCFC is integral with the main rotor 2020 of the engine. A fixed volume combustion chamber 2018 is sealed against the housing side wall 2015 by means of ring seals 2021. The engine rotor 2020, as shown, performs a compression stroke inside the inlet-compression volume 2011. Following additional rotation of the engine rotor 2020, the inlet to the combustion chamber 2018 coincides with transfer port 2012, whereupon the compressed fluid which is usually air is transferred into the combustion chamber 2018. Following further rotation of the engine rotor 2020, the charged compression chamber 2018 is advanced to the expansion-exhaust volume 2013.

The angular displacement of the compression-chamber 2018 corresponding to a disposition at which the transfer port 2012 of the intake-compression volume 2011 is closed and one at which port 2024 leading from the combustion chamber 2018 into the expansion volume 2013 is exposed is approximately 65° to 75°. During said angular displacement of the compression chamber 2018, the relative angular and circumferential velocity of the rotor apex 2025 is reduced by approximately 33%, due to the displacement of the rotating center of the rotor relative to the engine shaft, as well known to those skilled in the art. During the increased time period for the combustion process inside the combustion chamber, the angular displacement of the engine rotor 2020 is approximately 68° while that of the engine shaft 2023 is approximately 285°. As a result, a time period of approximately 0.02 sec at a shaft rotation of 4000 rpm is sufficient to allow the combustion to take place before port 2024 is exposed to the combustion chamber 2018 and the combusted fluid to burst therethrough into volume 2013 in order to perform useful work.

At the other end of the minor axis, the outlet of a combustion-chamber 2018 coincides with a pressure release port 2032 and said combustion-chamber 2018 is therefore able to release the residual burnt gas therefrom into the exhaust port 2054. Several degrees of rotation later, the combustion chamber 2018 exposes scavenge port 2031 and for a short period, release port 2032 and scavenge port 2031 are connected through the combustion-chamber 2018. A turbo-compressor supplied pressurized fluid, which is usually air delivered through port 2052, cleanses the combustion chamber 2018 and is directed via the scavenge port 2032 towards the exhaust port 2054.

In FIG. 20C, engine system 2000 is provided with two compression chambers 2018 for each rotor face. By employing an engine system having two compression chambers for each rotor face, side pressure from the rotor 2020 towards the opposite housing wall 2050 is avoided, and furthermore, a more compact compression chamber which is necessary for larger engines may be realized.

Figure 20D:
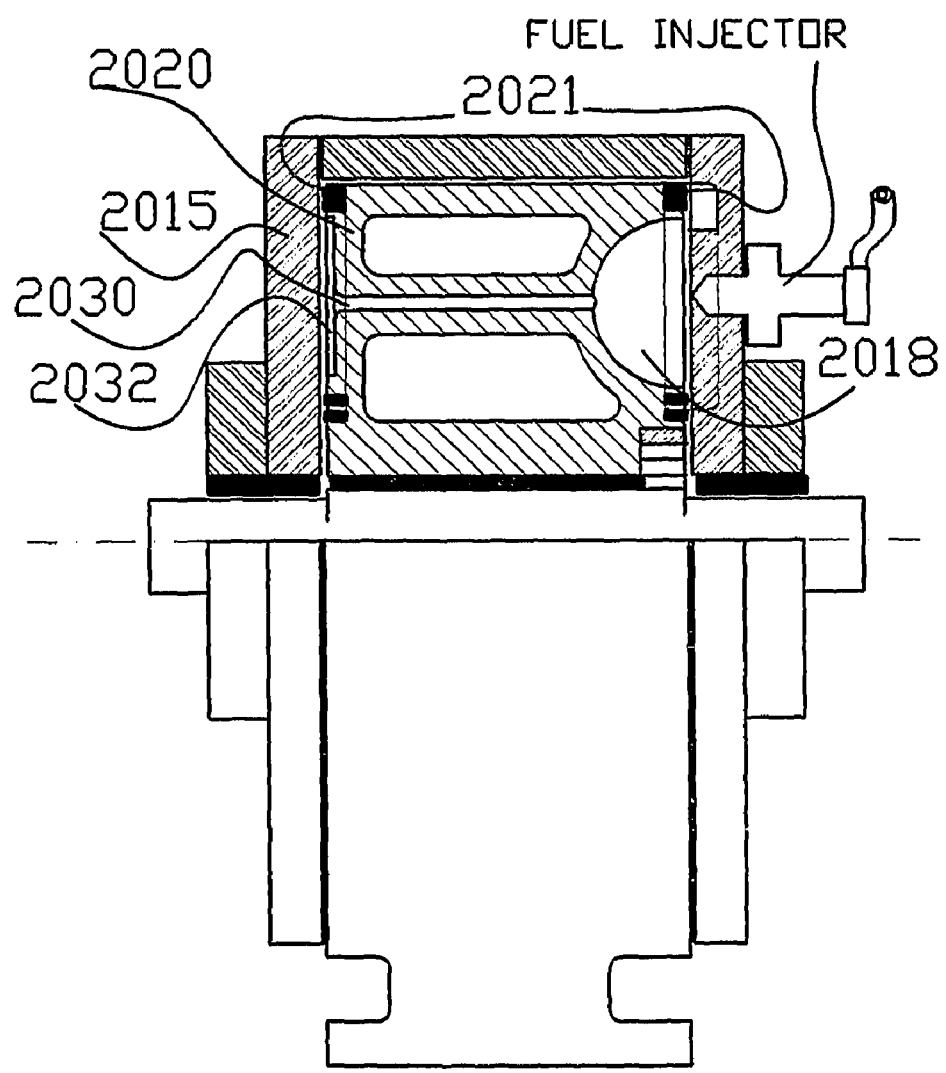
Figure 20E:
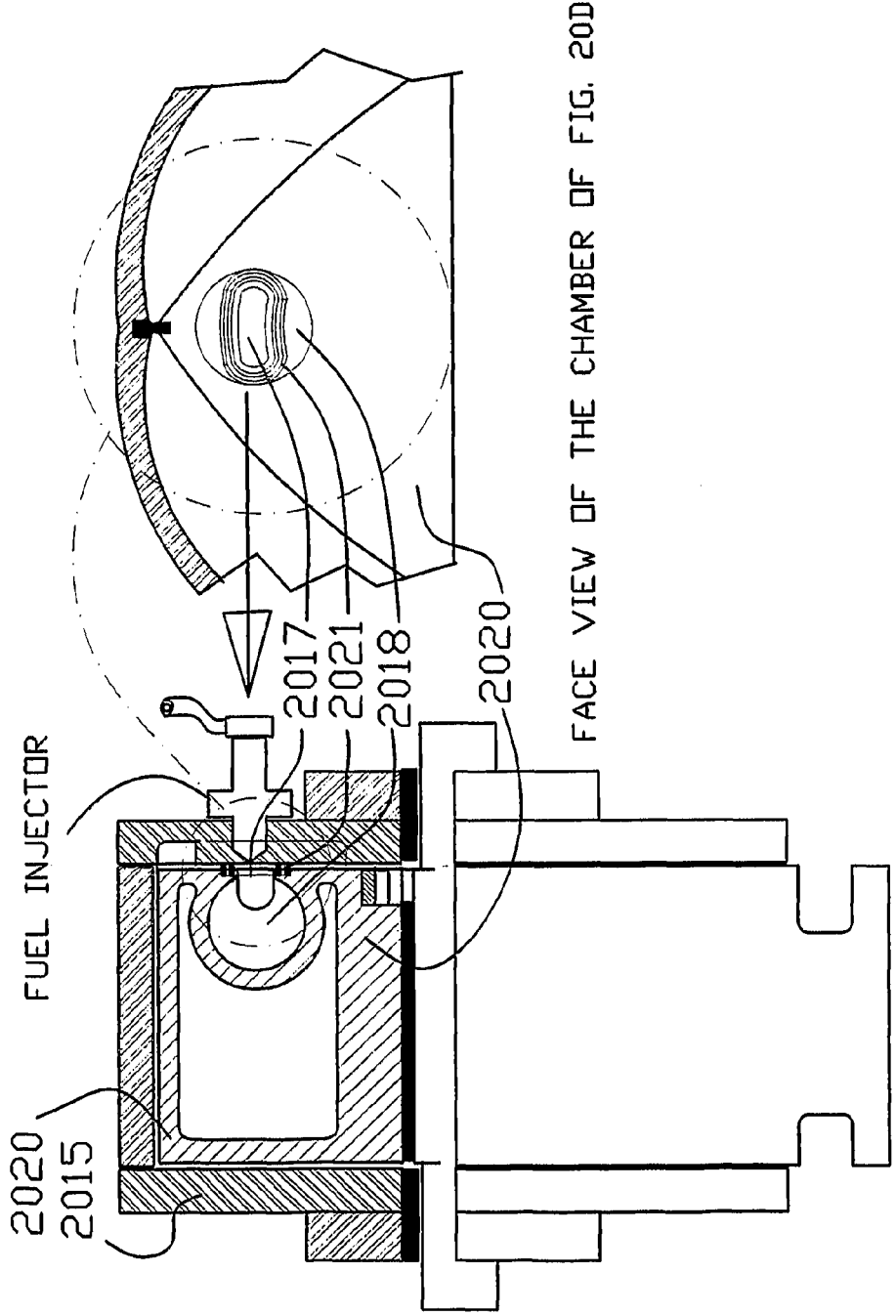

FIGS. 20D and 20E illustrate another embodiment of engine 2000 of FIG. 20B in which a side pressure inhibiting means is employed by the CCFC such that the side pressure is significantly reduced in FIG. 20E and is completely eliminated in FIG. 20D. Side pressure is normally applied to one of the side walls 2015 of the rotor housing when such inhibiting means is not employed due to compression and combustion pressure at the opposite side wall, thereby increasing the friction between the rotor 2020 and the housing wall 2015.

In FIG. 20D, a hemispherical or similarly shaped combustion chamber 2018 which is integral with the engine rotor 2020 and disposed at one side thereof is in communication by means of a small-diameter bore 2030 formed in the rotor 2020 to a very shallow recess 2032 on the opposite side of the rotor 2020. The shallow recess 2032 is sealed by means of sealing rings 2021 in the same way as the combustion chamber 2018 is sealed at the opposite side of the rotor 2020. The projected surface area of the shallow recess 2032 is substantially equal to that of the opening of the combustion chamber 2018, and the sealing rings 2021 of the combustion chamber 2018 are substantially of the same diameter as of the sealing rings 2021 of the shallow recess 2032. When the compression pressure and, sequentially, the combustion pressure are generated within the combustion chamber 2018, the resulting pressure is transmitted to the shallow recess 2032 at the opposite side of the rotor 2020 via the bore 2030 in order to balance the side pressure generated by the compression and the combustion within the combustion chamber. The shallow recess 2032 is needed in order to prevent the blockage of the bore 2030 by the side wall 2015. The projected surface area of the opening of combustion chamber 2018 and of the shallow recess 2032 are defined by the projected surface area which is enclosed by an inner sealing ring 2021.

In FIG. 20E, a side pressure inhibition means is employed in order to considerably and simply reduce the side pressure. Combustion chamber 2018 is of a completely spherical type and is disposed in the rotor 2020 at approximately the same location as the combustion chambers of FIGS. 20A-D. The opening 2017 of the combustion chamber 2018 is narrowed and elongated in order to minimize its projected surface area on one hand and to be sufficiently long on the other hand in order to cope with the fuel injection within a given rotation sector of the rotor 2020. The projected surface area of the opening 2017 may be about 25% to 40% of the projected surface area which is enclosed within the circle defined by the maximum diameter of the combustion chamber 2018. By providing such a reduction in the projected surface area of the opening 2017, a reduction ranging from 60% to 75% of the side force generated by the compression and combustion within the combustion chamber 2018 may be realized, since the pressure generating by the combustion chamber is acting on a smaller projected area. The opening 2017 is sealed against the rotor housing side wall by means of seal 2021.

Similarly, a relatively narrow and deep combustion chamber in which the projected surface areas of the opening and of the combustion chamber are substantially similar may be employed.

FIGS. 21A and 21B illustrate another embodiment of an engine-system generally designated by 2100, in which a variable compression-ratio CCFC is integral with the rotor 2120 of the engine. As the rotor 2120 rotates, a tiltable grooved cam 2148 controls the linear motion of the piston(s) 2114 inside the corresponding cylinders 2115 thereof formed in the rotor 2120. The relative position of the piston 2114 in its cylinder determines the volume of the corresponding combustion chamber 2118 and consequently controls the compression ratio. The contour of the grooved cam 2148 is similar in shape to the internal contour of the epitrochoidal rotor housing 2116, and smaller in size, in order to accommodate the path corresponding to the displacement of the pistons 2114, which are located near the apexes 2125 of the rotor 2120. The grooved cam 2148 is connected to the rotor housing 2116 by means of sleeve 2149 having a ball joint (not shown) on which the grooved cam 2148 is mounted. The degree to which grooved cam 2148 is tilted is controlled by a mechanically operating apparatus 2140 which is responsive to sensors that detect ambient conditions such as air density, temperature, or any other suitable parameters. The incremental swinging motion of the grooved cam 2148 is transmitted to piston 2114 by means of rocker arm 2144, which follows the path defined by grooved cam 2148, and wrist pin 2146 by which piston 2114 is connected to lever arm 2144. In addition to the wrist pin 2146, the relative angular motion between the rocker arm 2144 and the piston 2114 is made possible by means of pivot pin 2143 which is suitably fixed to the engine rotor 2120. The rocker-arm 2144 changes its angular position with respect to the tilting angle of its guiding grooved cam 2148 by means of its shaped end 2110. The grooved cam 2148 is connected to its controlling apparatus by means of connecting rod 2142. The piston 2114 may be displaced by any other suitable means well known to those skilled in the art for transferring rocking motion into reciprocating linear motion. The engine system 2100 is configured in such a way that the volume of the combustion-chamber 2118 at a maximum value when it receives the compressed fluid from the compression volume and at a minimum value; as controlled by apparatus 2140, when exposed to port 2124, in order to transfer the combustion product into the expansion volume at the beginning of each work stroke of the engine.

FIGS. 22A and 22B illustrate another embodiment of an engine system generally designated by 2200, in which a variable compression-ratio CCFC is integral with the rotor 2220 of the engine, which is provided with two chambers for each rotor face. As the rotor 2220 rotates, a double-grooved cam 2248 controls the linear motion of the piston(s) 2214 inside the corresponding cylinders 2215 thereof formed in the rotor 2220. The position of the piston 2114 in its cylinder determines the volume of the corresponding combustion chamber 2118 and consequently controls the compression-ratio. The contour of the disc 2248 is similar in shape to the internal contour of the epitrochoidal rotor housing 2216, and smaller in size, in order to accommodate the path corresponding to the displacement of the pistons 2214, which are located near the apexes 2225 of the rotor 2220. The double-grooved cam 2248 is integral with sleeve 2249. The motion corresponding to the path defined by the double-grooved cam 2248 is transmitted to a piston 2214 by means of rocker-arm 2244 and a wrist pin 2246, by which a piston 2214 is connected to rocker-arm 2244. In addition to the wrist pin 2246, angular motion between the rocker-arm 2244 to piston 2214 is made possible by means of pivot pin 2243 which is suitably fixed to the engine rotor 2220. The rocker-arm 2244 changes its angular position with respect to the grooved path of the double grooved cam 2248 by means of its shaped end 2210. The double-grooved cam 2248 is capable of changing the compression ratio of the engine by clockwise or counterclockwise angular motion, similar to the engines of FIGS. 15-18. The angular motion is transmitted to the double-grooved cam 2248 by means of its integral mounting sleeve 2249 by means of external lever 2219, a step motor 2259, or by any other suitable means. The displacement of pistons 2214 may be carried out by any other suitable means well known to those skilled in the art for transferring rocking motion into reciprocating linear motion. The engine system 2200 is configured in such a way that the volume of the combustion-chamber 2218 at a maximum value when it receives the compressed fluid from the compression volume and at a minimum value, in order to transfer the combustion product into the expansion volume at the beginning of each work stroke of the engine. Towards the end of the work stroke, the pistons 2214 are displaced to a maximum extent, in the vicinity of the top of the corresponding cylinder 2215, so as to evacuate the remaining of the burnt gas from the corresponding combustion chamber 2218. As the rotor 2220 continues to rotate, the pistons 2214 are retracted to their maximum volume position, or bottom dead center (BDC). In order to avoid backlash, the pistons are loaded by means of spring 2245. It will be appreciated that a spring loaded piston can be also be displaced by means of a single-walled cam while the springs generate motion in the opposite direction caused by a cam or any other similar means.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A rotary engine, comprising:
   a) rotor means enclosed by housing means including an inlet port and an exhaust port, to define a first intake and compression volume, and a second expansion and exhaust volume downstream to said first volume;
   b) at least one concentrically rotating, continuous combustion type constant-volume combustion chamber flow control device (CCFC) synchronized with said rotor means, receiving compressed fluid from said first volume, receiving fuel injected therein by means of a fuel injector located within a corresponding CCFC, igniting and burning an air-fuel mixture, to allow combustion products to expand in said second volume, and transferring said combustion products to said second volume; and
   c) a flow regulating unit that responds to an air flow sensing system.

2. The rotary engine according to claim 1, wherein the housing comprises a first housing for first and second side by side rotors which defines the first volume, and a second housing for third and fourth side by side rotors which defines and the second volume and is constructed in tandem with said first housing, the engine further comprising:
   a) two longitudinal shafts, axially fitted with bearings at the centers of said first and second housings, respectively; and
   b) two geared wheels that engages said two shafts so as to rotate in synchronized timed motion,
   wherein the CCFC is synchronized with said two shafts and with said first, second, third and fourth rotors.

3. The rotary engine according to claim 2, wherein each pair of first and second or third and fourth rotors are fixed to a corresponding shaft, one rotor of each of said pairs being located within a different volume of the corresponding housing at an inclination of approximately 180° with respect to the other rotor of each of said pairs, and each of said pairs of rotors synchronously rotating about a corresponding shaft.

4. The rotary engine according to claim 2, wherein a centrifugal band seal is used to seal a region between a large-radius peripheral contour to an opposite small-radius contour of said each rotor.

5. The rotary engine according to claim 2, wherein the CCFC is disposed within a central housing and said rotor rotates about the same shaft about which a pair of rotors rotates.

6. The rotary engine according to claim 2, wherein fuel is injected directly into the second volume.

7. A Wankel type rotary engine, comprising:
   a) at least one Wankel type rotor being enclosed by a corresponding rotor housing which includes an inlet port and an exhaust port;
   b) three apex seals provided to said at least one Wankel type rotor;
   c) two buffer seals located at two ends, respectively, of a minor axis of said corresponding housing which divide said corresponding housing into a first intake and compression volume, and a second expansion and exhaust volume downstream to said first volume; and
   d) at least one concentrically rotating combustion chamber flow control device (CCFC) synchronized with said at least one Wankel type rotor, receiving compressed fluid from said first volume, receiving fuel injected therein by means of a fuel injector located within a corresponding CCFC, igniting and burning an air-fuel mixture, to allow combustion products to expand in said second volume, and transferring said combustion products to said second volume;
   wherein said at least one CCFC has a rotor that is spaced from, and is independently operable with respect to, said at least one Wankel type rotor;
   wherein said at least one Wankel type rotor is operable to produce fluid pressures characteristic of a compression ignition engine independently of a K factor;
   wherein each of said three apex seals is passable by sliding contact over each one of said two buffer seals, and wherein each of said two buffer seals is configured to constantly contact a contour of said at least one Wankel type rotor.

8. The rotary engine according to claim 7, wherein the fuel injector injecting fuel into the compressed air of the CCFC is located in a downstream portion of the CCFC, or is located in an upstream portion of the CCFC, and
wherein the air-fuel mixture is rotated and delivered to the second volume.

9. The rotary engine according to claim 8, further comprising an ignition spark plug located at the downstream portion of the CCFC.

10. The rotary engine according to claim 7, wherein the CCFC is a continuous combustion type.

11. The rotary engine according to claim 10, further comprising an engine shaft operating compressor.

12. The rotary engine according to claim 10, wherein fuel is also injected directly into the second volume.

13. The rotary engine according to claim 7, wherein the CCFC comprises a plurality of combustion chambers, from which combustion products are scavengeable by a residual compression stroke pressure through a corresponding outlet port of each of said combustion chambers following sufficient rotation of said plurality of combustion chambers such that the corresponding outlet port of said each of the combustion chambers is in communication with an expansion port of the second volume.

14. The rotary engine according to claim 7, wherein the CCFC is a controlled compression-ratio CCFC which is controllable during an operation of the engine.

15. The rotary engine according to claim 14, wherein the compression ratio is controllable by at least one of a double-wall cam and cam follower of bi-directional operation, a piston that is displaceable by a cam and cam follower roller in one direction and displaceable in the opposite direction by a corresponding set of preloaded springs, and an eccentric shaft, a hub and connecting-rods.

16. The rotary engine according to claim 7, wherein the CCFC is disposed along an outer circumference of the engine, on a top of the engine, or to a side of the engine and is perpendicular to a shaft on which the rotor means is mounted.

17. The rotary engine according to claim 7, wherein the CCFC comprises pistons which are displaceable in a direction parallel to a shaft on which the rotor is mounted.

18. The rotary engine according to claim 7, wherein the CCFC is driven by at least one of a geared wheel transmission, an internally geared wheel transmission, a toothed belt and wheel transmission, and a chain and sprocket wheel transmission.

19. The rotary engine according to claim 7, wherein a CCFC drive shaft is also a power output shaft of the engine.

20. The rotary engine according to claim 7, wherein the CFC is integral with, and disposed within, rotor, and is of a fixed volume type or is of a variable compression-ratio type.

21. The rotary engine according to claim 7, wherein the CCFC comprises two combustion chambers of constant volume or of a variable compression ratio for each rotor bank, the two combustion chambers of said each rotor bank being disposed on opposite sides of the rotor.

22. The rotary engine according to claim 7, wherein the CCFC is of a side pressure eliminating type or of a side pressure reducing type and disposed within said each rotor.

23. The rotary engine according to claim 7, wherein the two buffer seals comprise a bouncing absorbing system comprising at least one of an oil damper, a contact pressure regulator, channeling means formed in a buffer seal housing for equalizing engine fluid pressure acting on the buffer seal, and a combination thereof.

24. The rotary engine according to claim 7, wherein said each of the three apex seals has a guiding path which is inclined towards the rotational direction of the rotor.

25. The rotary engine according to claim 7, further comprising a counterweight mounted within a rotor apex which is connected to said each of the three apex seals by lever arms in order to counterbalance centrifugal forces.

26. The rotary engine according to claim 7, wherein said each of the three apex seals is shaped in such a way that an outer congruence between an apex seal boundary and the at least one Wankel type rotor is beveled.

27. The rotary engine system according to claim 7, wherein the two buffer seals are shaped in a way that an outer congruence between a buffer seal boundary and an internal contour of the housing is beveled.

28. The rotary engine according to claim 7, further comprising at least one component selected from the group consisting of a turbocompressor and an intercooler.

* * * * *